United States Patent
Li et al.

(10) Patent No.: US 11,582,474 B2
(45) Date of Patent: Feb. 14, 2023

(54) SYSTEMS AND METHODS FOR BI-DIRECTIONAL GRADIENT CORRECTION

(71) Applicant: ALIBABA GROUP HOLDING LIMITED, Grand Cayman (KY)

(72) Inventors: Xinwei Li, San Mateo, CA (US); Jie Chen, San Mateo, CA (US); Ru-Ling Liao, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/391,542

(22) Filed: Aug. 2, 2021

(65) Prior Publication Data
US 2022/0038727 A1 Feb. 3, 2022

Related U.S. Application Data

(60) Provisional application No. 63/060,624, filed on Aug. 3, 2020.

(51) Int. Cl.
| | | |
|---|---|---|
| *H04N 19/159* | (2014.01) | |
| *H04N 19/186* | (2014.01) | |
| *H04N 19/46* | (2014.01) | |
| *H04N 19/44* | (2014.01) | |

(52) U.S. Cl.
CPC ........... *H04N 19/44* (2014.11); *H04N 19/159* (2014.11); *H04N 19/186* (2014.11); *H04N 19/46* (2014.11)

(58) Field of Classification Search
CPC .... H04N 19/44; H04N 19/159; H04N 19/186; H04N 19/46

USPC ..................................................... 375/240.25
See application file for complete search history.

(56) References Cited

FOREIGN PATENT DOCUMENTS

| | | | | |
|---|---|---|---|---|
| CN | 105491390 A | 4/2016 | | |
| CN | 111083484 A | 4/2020 | | |
| CN | 111448797 A | 7/2020 | | |
| CN | 112004091 A | * 11/2020 | ........... | H04N 19/109 |
| CN | 112055221 A | * 12/2020 | ........... | H04N 19/513 |
| CN | 112565768 A | * 3/2021 | | |
| WO | WO-2018230493 A1 | * 12/2018 | | |

(Continued)

OTHER PUBLICATIONS

Chen, English Translation of CN-112004091-A, Nov. 2020 (Year: 2020).*

(Continued)

*Primary Examiner* — Albert Kir
(74) *Attorney, Agent, or Firm* — Finnegan, Henderson, Farabow, Garrett & Dunner, LLP

(57) ABSTRACT

The present disclosure provides video decoding method. An exemplary method includes: decoding a first parameter for a coding unit from a bitstream, and determining a candidate for the coding unit based on the first parameter; determining a value of a second parameter associated with the coding unit based on a value of a second parameter associated with the candidate, wherein the second parameter indicates whether a bi-directional prediction correction is enabled; and in response to the value of the second parameter associated with the coding unit indicating the bi-directional prediction correction being enabled, performing the bi-directional prediction correction on the coding unit.

23 Claims, 16 Drawing Sheets

(56) References Cited

FOREIGN PATENT DOCUMENTS

| WO | WO2020154615 A1 | 7/2020 | |
|---|---|---|---|
| WO | WO-2020184487 A1 * | 9/2020 | ........... H04N 19/105 |
| WO | WO2022028422 | 2/2022 | |

OTHER PUBLICATIONS

Chen, English Translation of CN-112565768-A, 13/2021 (Year: 2021).*
Fang, English Translation of CN-112055221-A, Dec. 2020 (Year: 2020).*
Chen, English Translation of WO-2018230493-A1, Dec. 2018 (Year: 2018).*
Call for New generation AVS3 video coding proposals, AVS-N2509, Dec. 2017, 4 pages.
HPM, fto://47.93.196.121/Public/codec/video_codec/HPM.
Liang F., "AVS3-P2(CD4.0)", AVS-N2724, Aug. 2019, 228 pages.
PCT International Search Report and Written Opinion dated Nov. 10, 2021, issued in corresponding International Application No. PCT/CN2021/110338 (7 pgs.).

* cited by examiner

Motion Derivation In UMVE

SYSTEMS AND METHODS FOR BI-DIRECTIONAL GRADIENT CORRECTION

CROSS-REFERENCE TO RELATED APPLICATIONS

The present disclosure claims priority to U.S. provisional application No. 63/060,624 filed on Aug. 3, 2020, which is incorporated herein by reference in its entirety.

TECHNICAL FIELD

The present disclosure generally relates to video processing, and more particularly, to systems and methods for bi-directional gradient correction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY

Embodiments of the present disclosure provide a video processing method and a video processing apparatus. The method can include: decoding a first parameter for a coding unit from a bitstream, and determining a candidate for the coding unit based on the first parameter; determining a value of a second parameter associated with the coding unit based on a value of a second parameter associated with the candidate, wherein the second parameter indicates whether a bi-directional prediction correction is enabled; and in response to the value of the second parameter associated with the coding unit indicating the bi-directional prediction correction being enabled, performing the bi-directional prediction correction on the coding unit.

The apparatus can include a memory storing a set of instructions; and one or more processors configured to execute the set of instructions to cause the apparatus to perform: decoding a first parameter for a coding unit from a bitstream, and determining a candidate for the coding unit based on the first parameter; determining a value of a second parameter associated with the coding unit based on a value of a second parameter associated with the candidate, wherein the second parameter indicates whether a bi-directional prediction correction is enabled; and in response to the value of the second parameter associated with the coding unit indicating the bi-directional prediction correction being enabled, performing the bi-directional prediction correction on the coding unit.

The embodiments of the present disclosure further provide a non-transitory computer readable medium that stores a set of instructions that is executable by at least one processor of a computer to cause the computer to perform a method for processing video content, the method comprising: decoding a first parameter for a coding unit from a bitstream, and determining a candidate for the coding unit based on the first parameter; determining a value of a second parameter associated with the coding unit based on a value of a second parameter associated with the candidate, wherein the second parameter indicates whether a bi-directional prediction correction is enabled; and in response to the value of the second parameter associated with the coding unit indicating the bi-directional prediction correction being enabled, performing the bi-directional prediction correction on the coding unit.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
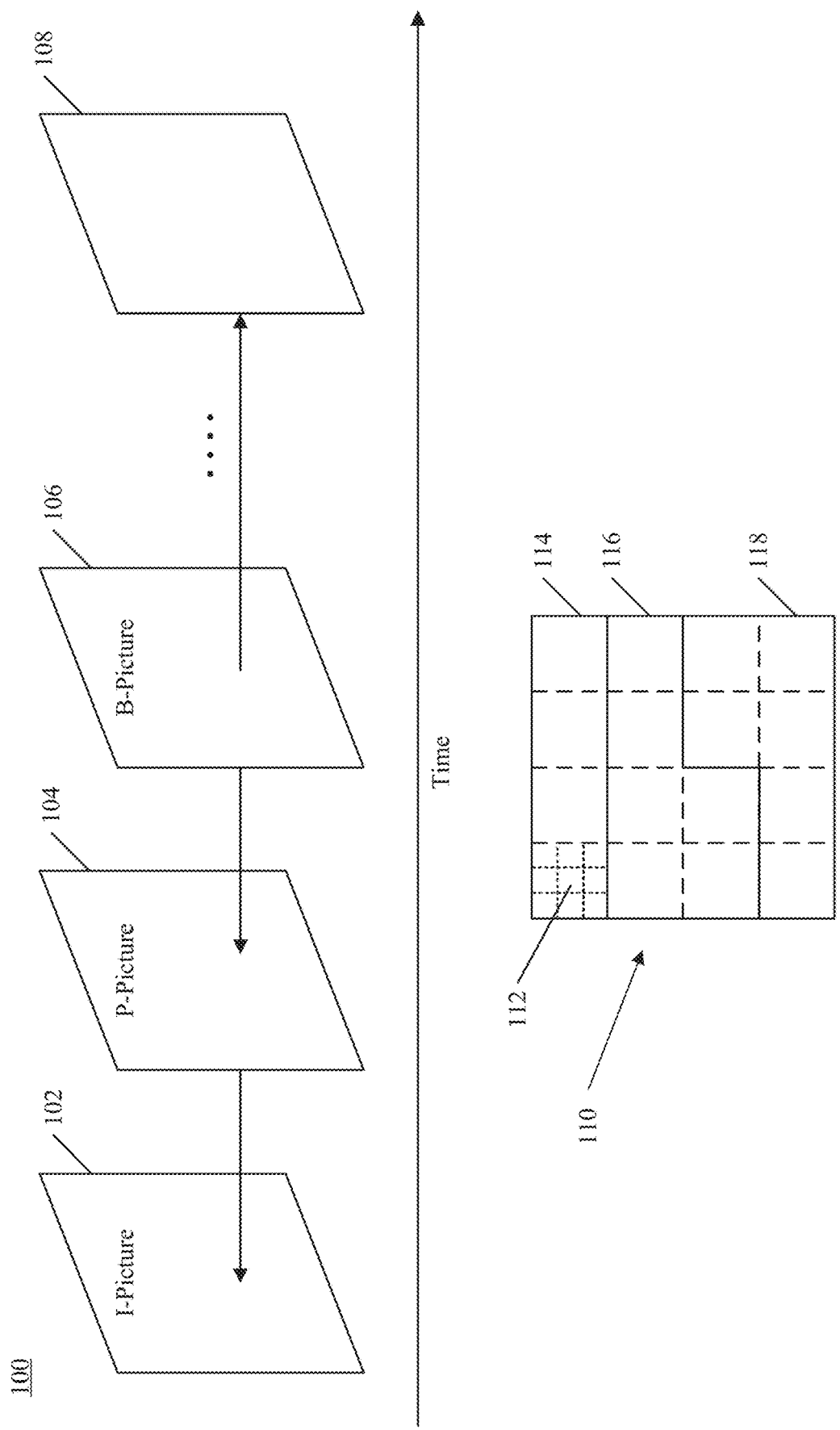
FIG. 1 illustrates a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

The present disclosure is directed to methods and apparatuses for processing video content consistent with above-described video coding standards.

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
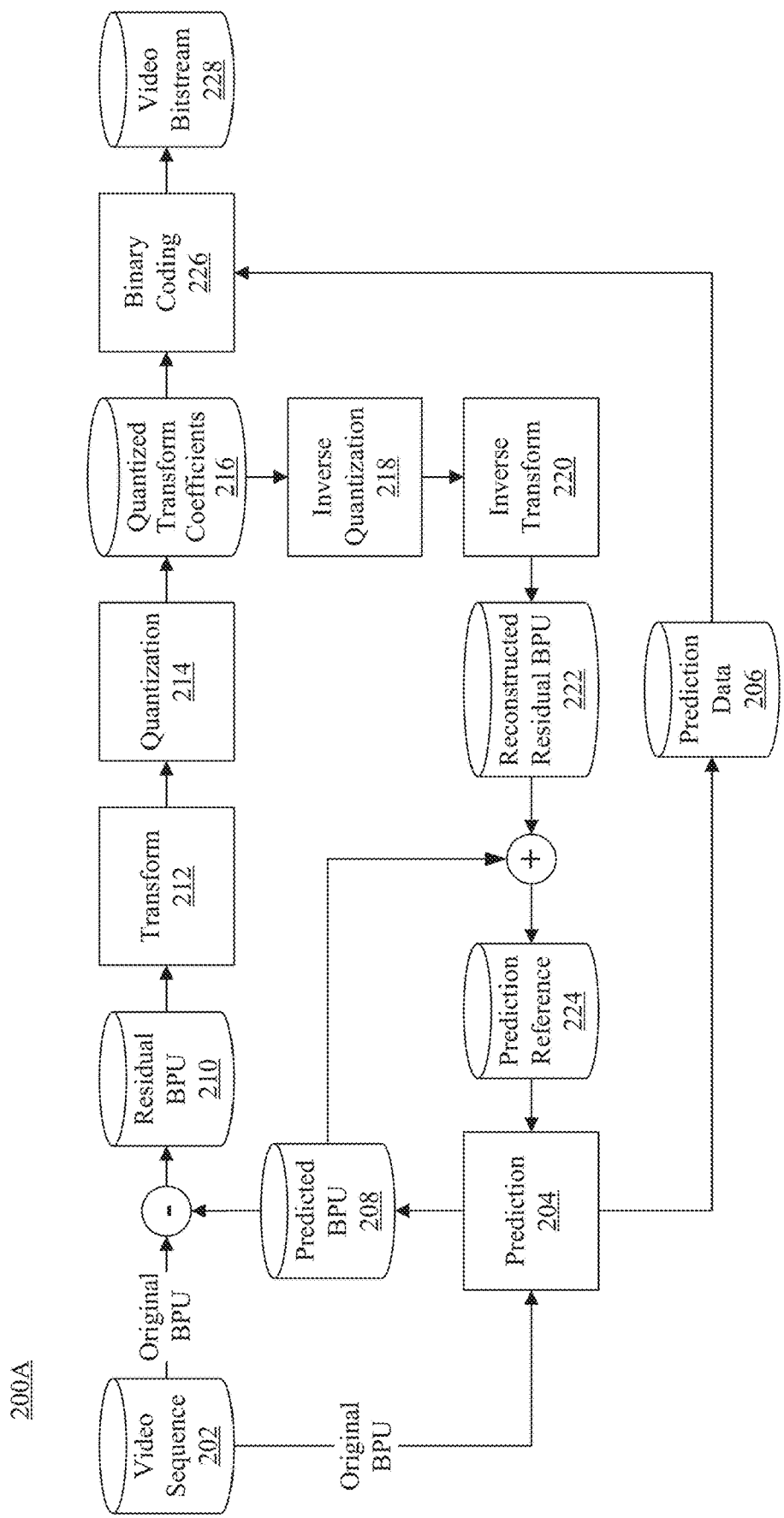
FIG. 2A illustrates a schematic diagram illustrating an exemplary encoding process of a hybrid video coding system, consistent with some embodiments of the present disclosure.
Figure 2B:
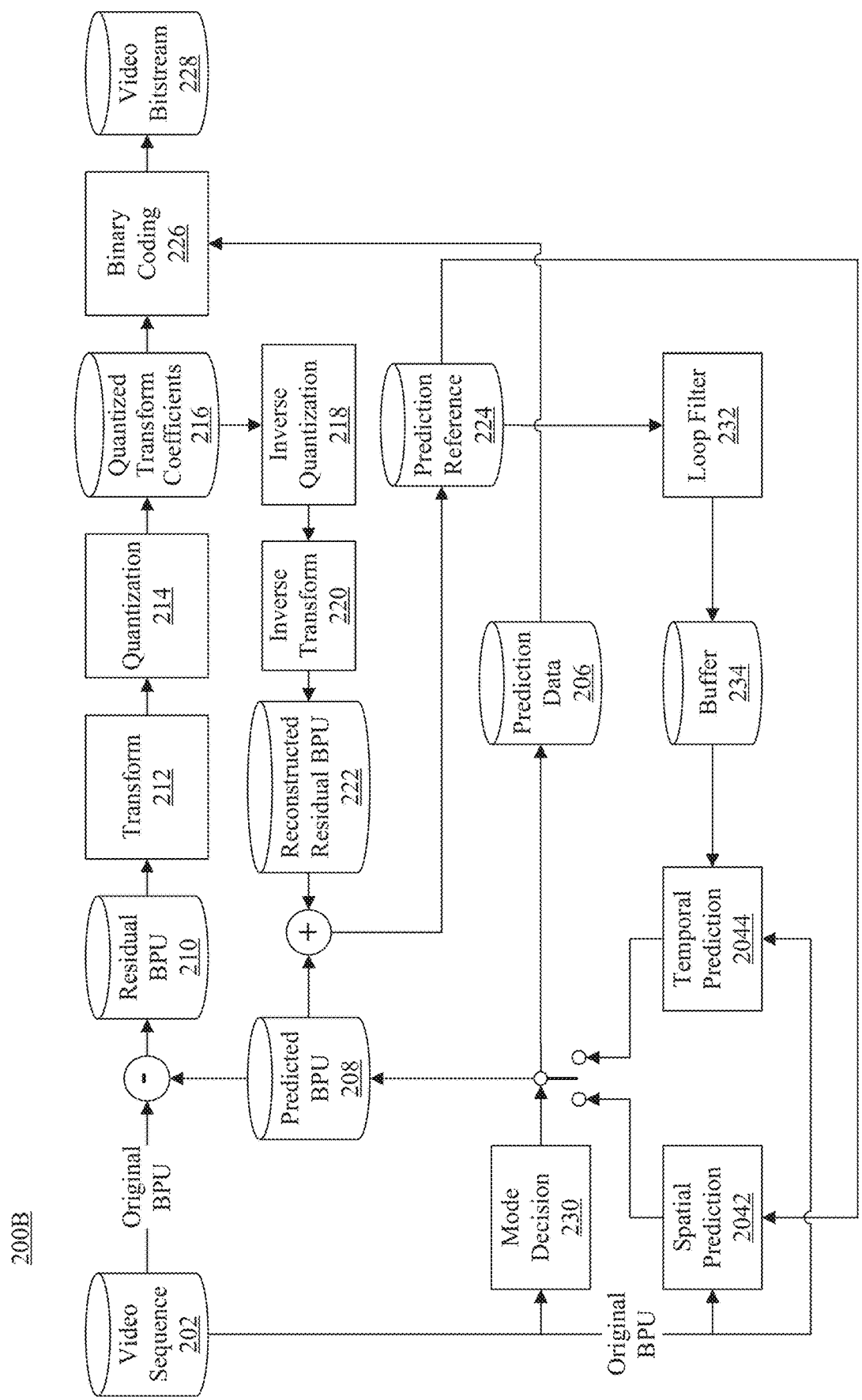
FIG. 2B illustrates a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224 and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder may record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
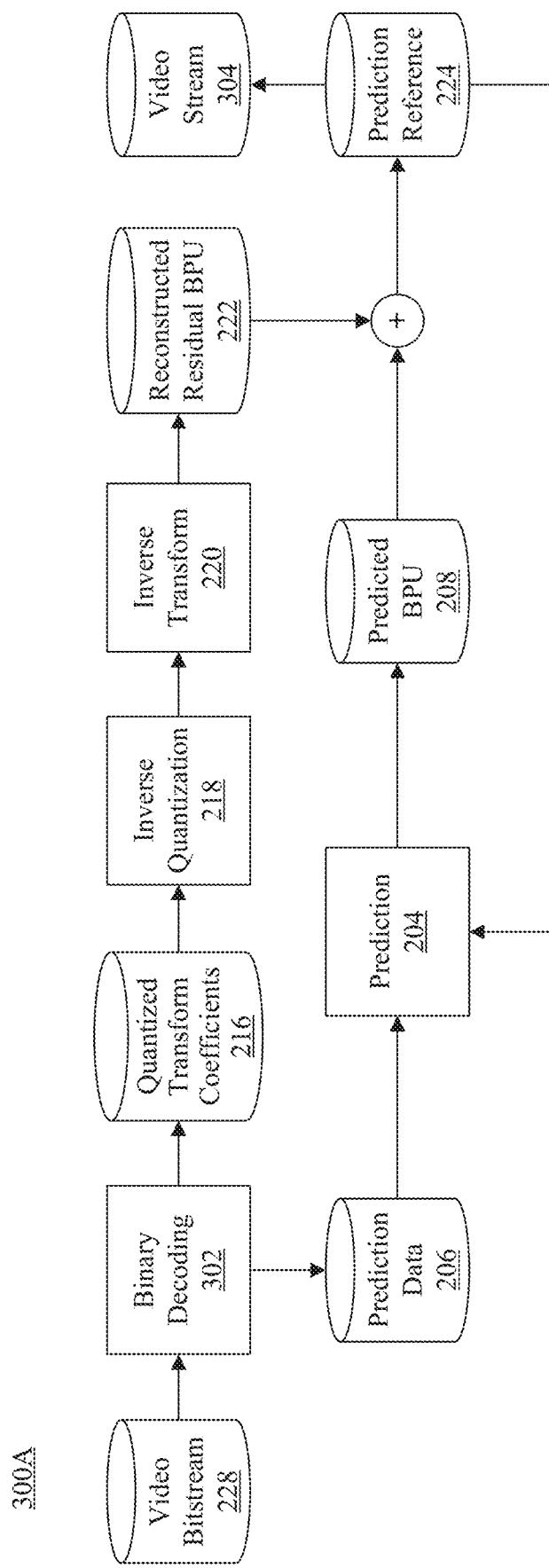
FIG. 3A illustrates a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
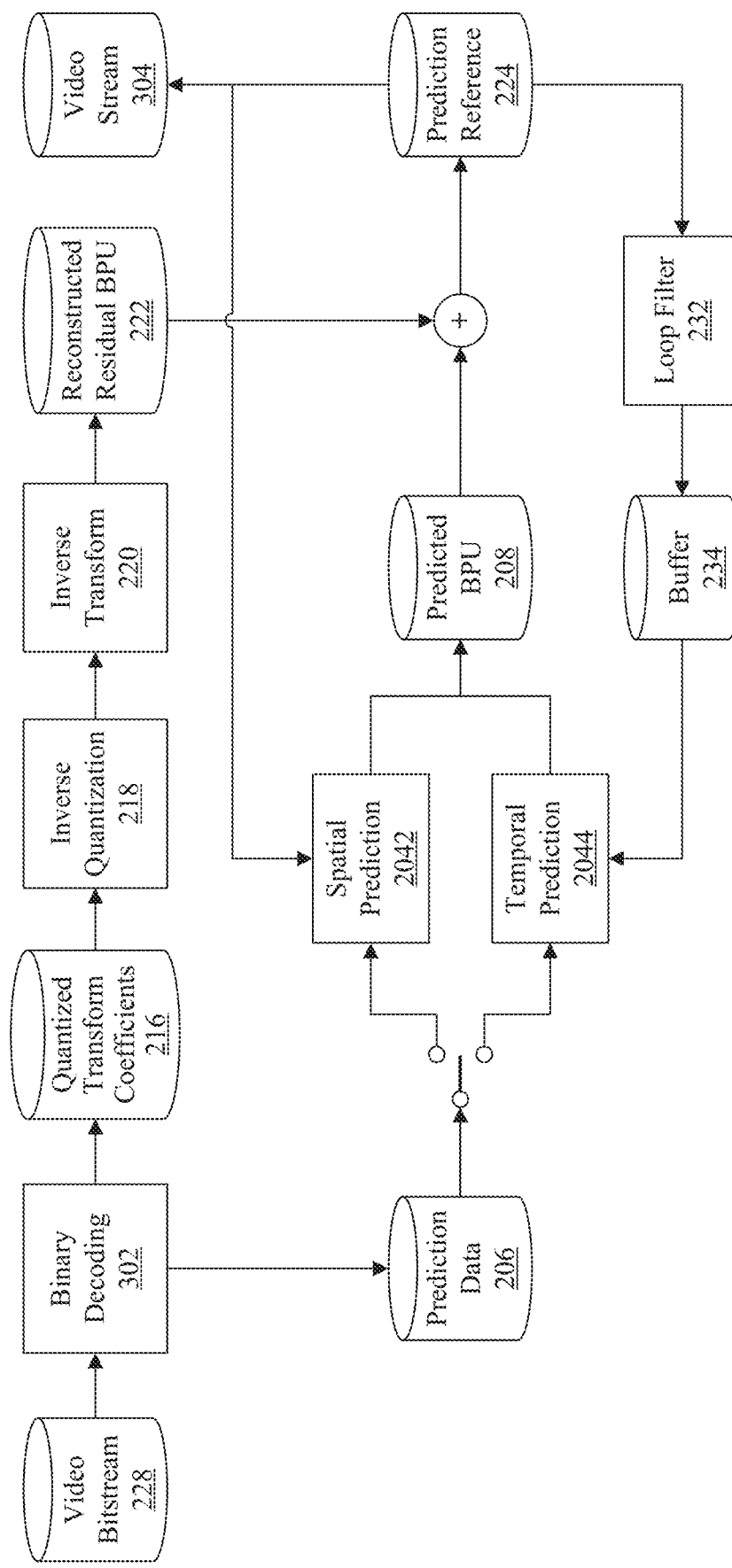
FIG. 3B illustrates a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
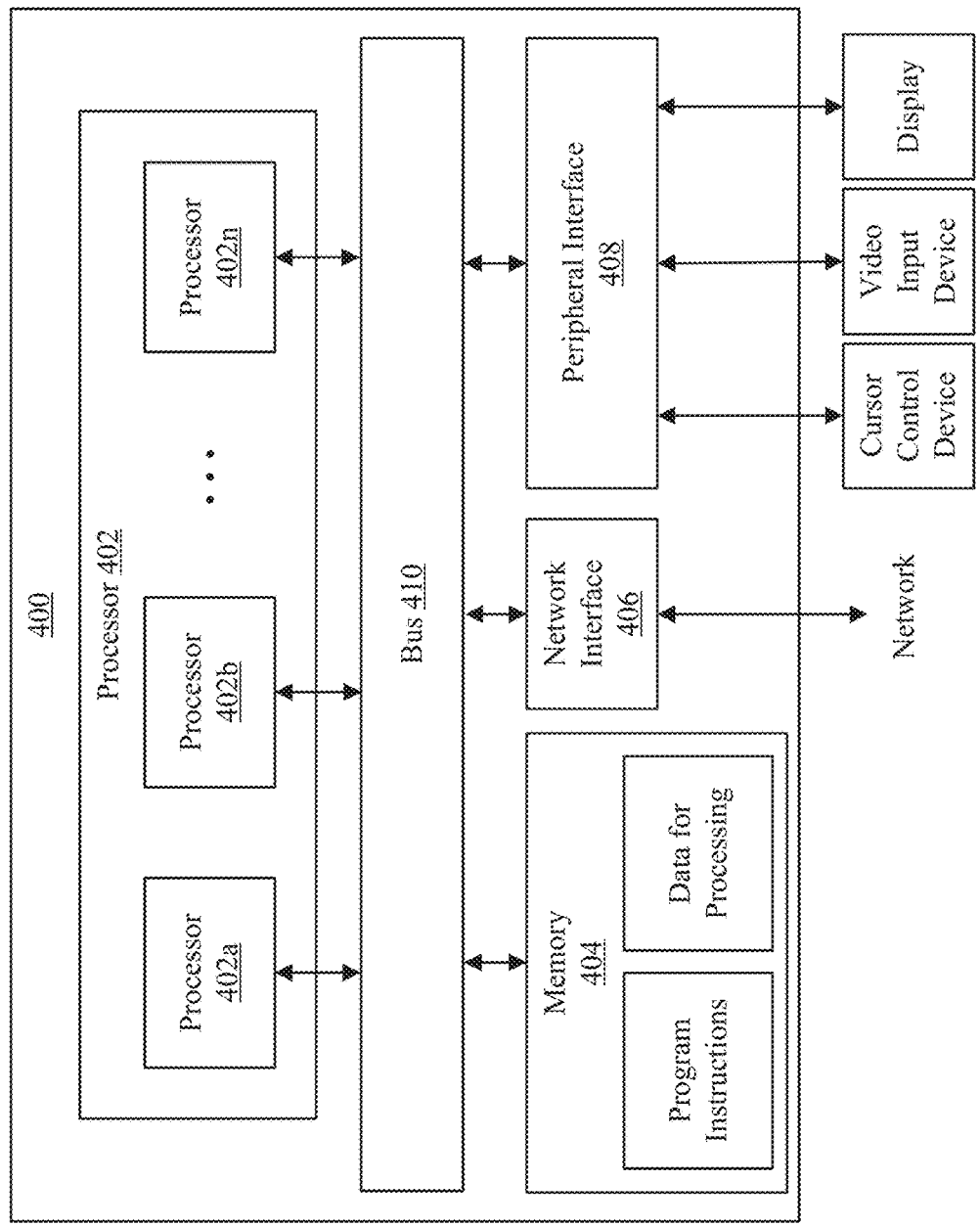
FIG. 4 illustrates a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Audio Video coding Standard (AVS) Workgroup which was founded in 2002 in China is currently developing the AVS3 video standard, a third generation of AVS video standard. The predecessor of AVS3 standard, AVS1 and AVS2 were issued as China national standard in the year of 2006 and 2016, respectively. In December of 2017, a call for proposals (CfP) was issued by AVS workgroup to formally start the development of the third generation of AVS standard AVS3. In December of 2018, High Performance Model (HPM) was chosen by the workgroup as a new reference software platform for AVS3 standard development. The initial technologies in HPM was inherited from AVS2 standard, and based on that, more and more new advanced video coding technologies were adopted to improve the compression performance. In the year of 2019, the first phase of AVS3 standard was finalized and got more than 20% coding performance gain compared with its predecessor AVS2, and the second phase of AVS3 standard is still being developed on top of the first phase of AVS3 to get further coding efficiency.

AVS3 standard is based on the same hybrid video coding system that has been used in modern video compression standards such as AVS1, AVS2, H.264/AVC, H.265/HEVC, etc. As shown in FIG. 1, the input video is processed block by block. In AVS3, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or extended binary tree. At the leaf nodes of the partitioning structure, coding information such as coding mode (intra mode or inter mode), motion information (reference index, motion vector difference, etc.) if inter coded, and quantized residual coefficients are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision and encoder control block choose the best prediction mode for the current block, for example based on the rate-distortion optimization method. Based on the best prediction mode, the prediction block is generated and subtracted from the input video block. The prediction residual is sent to the transform and quantization modules to generate the quantized residual coefficients. The quantized residual coefficients will then be inverse quantized and inverse transformed to obtain the reconstructed residual. The prediction block and the reconstructed residual are added together to form the reconstructed block before loop filtering, which is used to provide reference samples for intra prediction. Loop filtering such as deblocking, sample adaptive offset (SAO), and adaptive loop filter (ALF) may be applied to the reconstructed blocks to form the reconstructed block after loop filtering, which is stored in the decoded picture buffer, and used to provide reference samples for inter prediction. Coding information such as coding mode (intra or inter prediction), intra prediction mode, motion information, quantized residual coefficients, and the like, are sent to the entropy coding module to further reduce the bit rate before being packed into the output video bitstream.

In AVS3, a bi-directional gradient correction technology is supported for bi-prediction inter mode. Bi-directional gradient correction (BGC) uses the difference between two bi-directional reference blocks to correct the prediction block. For the bi-prediction inter mode, the prediction block, $Pred_{BI}$, is generated by averaging the two bi-directional prediction blocks $Pred_0$ and $Pred_1$, obtained from two different reference pictures or using two different motion vectors. The BGC further calculates the corrected prediction block Pred based on the following equation:

$$\text{Pred} = \begin{cases} \text{Pred}_{BI}, & \text{BgcFlag} = 0 \\ \text{Pred}_{BI} + ((\text{Pred}_1 - \text{Pred}_0) \gg k), & \text{BgcFlag} = 1, \text{BgcIdx} = 0 \\ \text{Pred}_{BI} + ((\text{Pred}_0 - \text{Pred}_1) \gg k), & \text{BgcFlag} = 1, \text{BgcIdx} = 1 \end{cases} \quad \text{(Eq. 1)}$$

where k is the correct intensity factor and is set to 3 in AVS3. For a block that is coded in bi-prediction inter mode and satisfies the BGC application conditions, a flag, BgcFlag, is signaled to indicate whether BGC is used or not. When BGC is used, an index, BgcIdx, is further signaled to indicate which correction method is used. Both the BgcFlag and BgcIdx are signaled using context coded bins.

The BGC application conditions are as follows: 1) The current block is coded using bi-prediction mode; 2) The number of luma samples of the current block is not less than 256; 3) The prediction mode of the current block is not skip or direct mode; 4) The BGC is only applied to luma samples; 5) The display order of the current picture is between the two reference pictures. One of the two reference pictures is prior to the current picture and the other reference picture is after the current picture in display order.

Skip mode and direct mode are two special inter modes in AVS3 where the motion information including reference index and motion vector is not signaled in the bitstream but derived at the decoder side with a same rule as encoder does. These two modes share the same motion information derivation rule, and the difference between them is that skip mode skips the signaling of the residuals by setting residuals to be zero. Compared with normal inter modes, the bits dedicated on the motion information can be saved in the skip and direct modes, although the encoder has to follow the rule specified in the standard to derive the motion vector and reference index to perform inter prediction. Therefore, the skip mode and direct mode are suitable to the case where the motion information of the current block is close to that of spatial or temporal neighboring block, because the derivation of the motion information is based on the spatial or temporal neighboring block.

To derive the motion information used in inter prediction in skip and direct modes, the encoder derives a list of motion candidates first and then selects one of them to perform the inter prediction. The index of the selected candidate is signaled in the bitstream. In decoder side, the decoder derives the same list of motion candidates as encoder, uses the index parsed from the bitstream to get the motion used for inter prediction, and then performs inter prediction.

Currently in AVS3, there are 12 candidates in the candidate list, as described below.

The first candidate is temporal motion vector predictor (TMVP) which is derived from the motion vector (MV) of collocated block in a certain reference frame. The certain reference frame here is specified as the reference frame with reference index being 0 in the list1 for B frame or list0 for P frame. When the MV of the collocated block is unavailable, a MV predictor (MVP) derived according to the MV of spatial neighboring blocks is used as TMVP.

Figure 5:
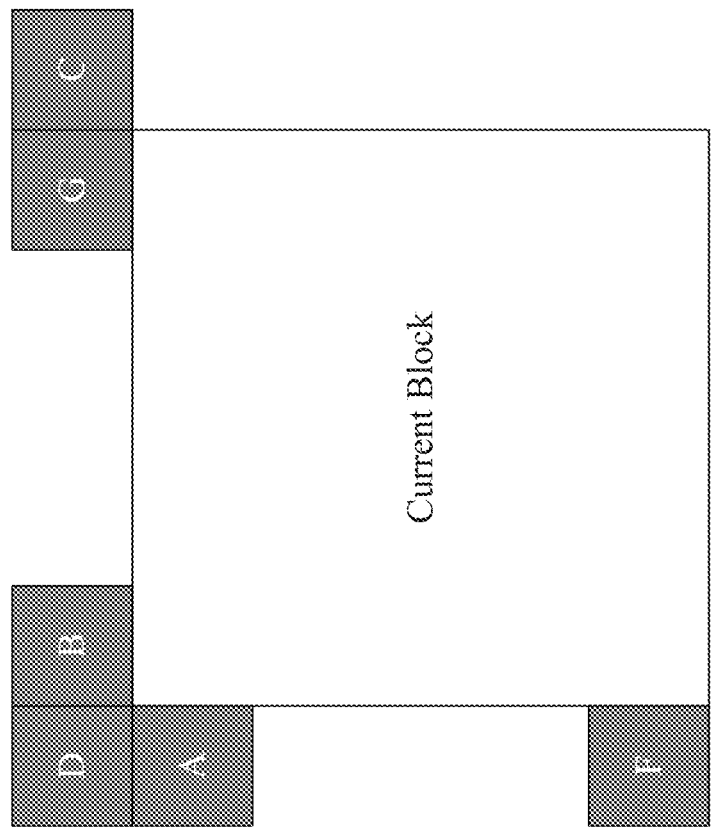
FIG. 5 is a schematic diagram illustrating exemplary neighboring blocks used for spatial motion vector predictor (SMVP) derivation, according to some embodiments of the present disclosure.

The second, third and fourth candidates are the spatial motion vector predictors (SMVPs). FIG. 5 is a schematic diagram illustrating exemplary neighboring blocks used for spatial motion vector predictor (SMVP) derivation, according to some embodiments of the present disclosure. As shown in FIG. 5, the SMVP is derived from the six neighboring blocks F, G, C, B, A, D. The second candidate is a bi-prediction candidate, the third candidate is an uni-prediction candidate with reference frame in list0, and the fourth candidate is an uni-prediction candidate with reference frame in list1. These three candidates are set to be the first available MV of the six neighboring blocks in a specified order. After the SMVP candidates, the motion vector angular prediction candidates (MVAP) and history based motion vector predictor candidates (HMVP) are added.

History based motion vector predictor (HMVP) is derived from motion information of the previously encoded or decoded blocks. After encoding or decoding an inter coded block, the motion information is added to the last entry of a HMVP table, where the size of the HMVP table is set to 8. When inserting a new motion candidate to the table, a constrained first-in-first-out (FIFO) rule is utilized where redundancy check is firstly applied to find whether there is an identical motion candidate in the table. If found, the identical motion candidate is moved to the last entry of the table instead of inserting the new identical entry. The candidates in the HMVP table will be used as HMVP candidates for skip and direct modes. The HMVP table is checked from the last entry to the first entry. If a candidate in HMVP table is not identical to any temporal motion vector predictor (TMVP) candidate and spatial motion vector predictor (SMVP) candidate in the candidate list of skip and direct modes, the candidate in HMVP table is put into the candidate list of skip and direct modes as a HMVP candidate. If a candidate in HMVP table is identical to one of TMVP candidate or SMVP candidate, this candidate is not put into candidate list of skip and direct modes. This process is referred to as pruning in this disclosure.

In addition to skip or direct mode, where the implicitly derived motion information is directly used for prediction blocks generation, the ultimate motion vector expression is introduced in AVS3. An ultimate motion vector expression (UMVE) flag is signaled to specify whether UMVE mode is used for a block.

Figure 6:
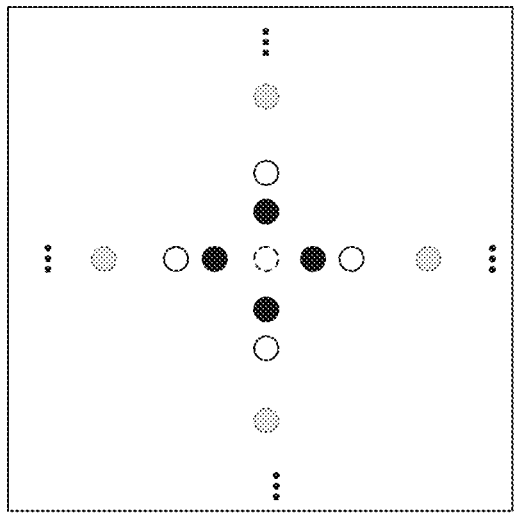
FIG. 6 is a schematic diagram illustrating an exemplary motion derivation in ultimate motion vector expression (UMVE), according to some embodiments of the present disclosure.
Figure 6:
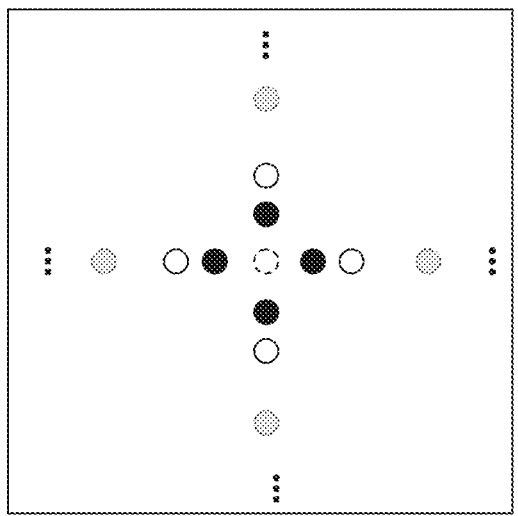

In UMVE, after a skip or direct candidate is selected, it is further refined by the signaled motion vector differences (MVDs) information. The further information includes a skip or direct candidate flag, an index to specify offset motion distance, and an index for indication of offset motion direction. In UMVE mode, one of the two candidates in the skip or direct candidates is selected to be used as the base motion vector and the starting point. Direction index represents the direction of the MVD relative to the starting point. FIG. 6 is a schematic diagram illustrating an exemplary motion derivation in (UMVE), according to some embodiments of the present disclosure. The direction index can represent the four directions, as shown in FIG. 6. Distance index specifies motion magnitude information and indicates the pre-defined offset from the starting point. The relation of distance index and pre-defined offset is specified in Table 1 and Table 2. A flag can be signaled in the picture header to determine whether to use Table 1 or Table 2.

TABLE 1

5 MVD offsets for the UMVE mode

| MVD offset (pel) | ¼ | ½ | 1 | 2 | 4 |

TABLE 2

| 8 MVD offsets for the UMVE mode | | | | | | | |
|---|---|---|---|---|---|---|---|
| MVD offset (Pel) | 1/4 | 1/2 | 1 | 2 | 4 | 8 | 16 | 32 |

In AVS3, an inter prediction filter is applied to direct mode to filter the prediction blocks. If the current block is coded by direct mode and is not coded by affine motion compensation (AFFINE) or UMVE mode, a flag is signaled to indicate whether Inter Prediction Filter (InterPF) is used or not. In decoder side, the decoder performs the same filter operation as encoder when the parsed InterPF flag is true. There are two filter methods and an InterPF index is signaled to indicate which filter method is used.

When the InterPF index is equal to 1, the InterPF filter uses the prediction block and neighboring pixels in the above, below, right, and left side of the current block to do weighted average to get the final prediction block based on the following equations:

$$Pred(x, y) = (Pred\_inter(x, y)*5 + Pred\_Q(x, y)*3) \gg 3 \quad \text{(Eq. 2)}$$

$$Pred\_Q(x, y) = (Pred\_V(x, y) + Pred\_H(x, y) + 1) \gg 2 \quad \text{(Eq. 3)}$$

$$Pred\_V(x, y) = ((h-1-y)*Rec(x, -1) + \\ (y+1)*Rec(-1, h) + (h \gg 1)) \gg \log2(h) \quad \text{(Eq. 4)}$$

$$Pred\_H(x, y) = ((w-1-x)*Rec(-1, y) + \\ (x+1)*Rec(w, -1) + (w \gg 1)) \gg \log2(w) \quad \text{(Eq. 5)}$$

where Pred_inter is the unfiltered prediction block, Pred is the final prediction block, and Rec represents the reconstructed neighboring pixels. The width and height of the current block are represented by w and h, respectively.

When the InterPF index is equal to 1, the InterPF filter uses the prediction block and neighboring pixels in the above and left side of the current block to do weighted average to get the final prediction block based on the following equation:

$$Pred(x,y)=f(x)*Rec(-1,y)+f(y)*Rec(x,-1)+(1-f(x)-f(y))*Pred\_inter(x,y) \quad \text{(Eq. 6)}$$

where f(x) and f(y) are two weighted factors.

Figure 7:
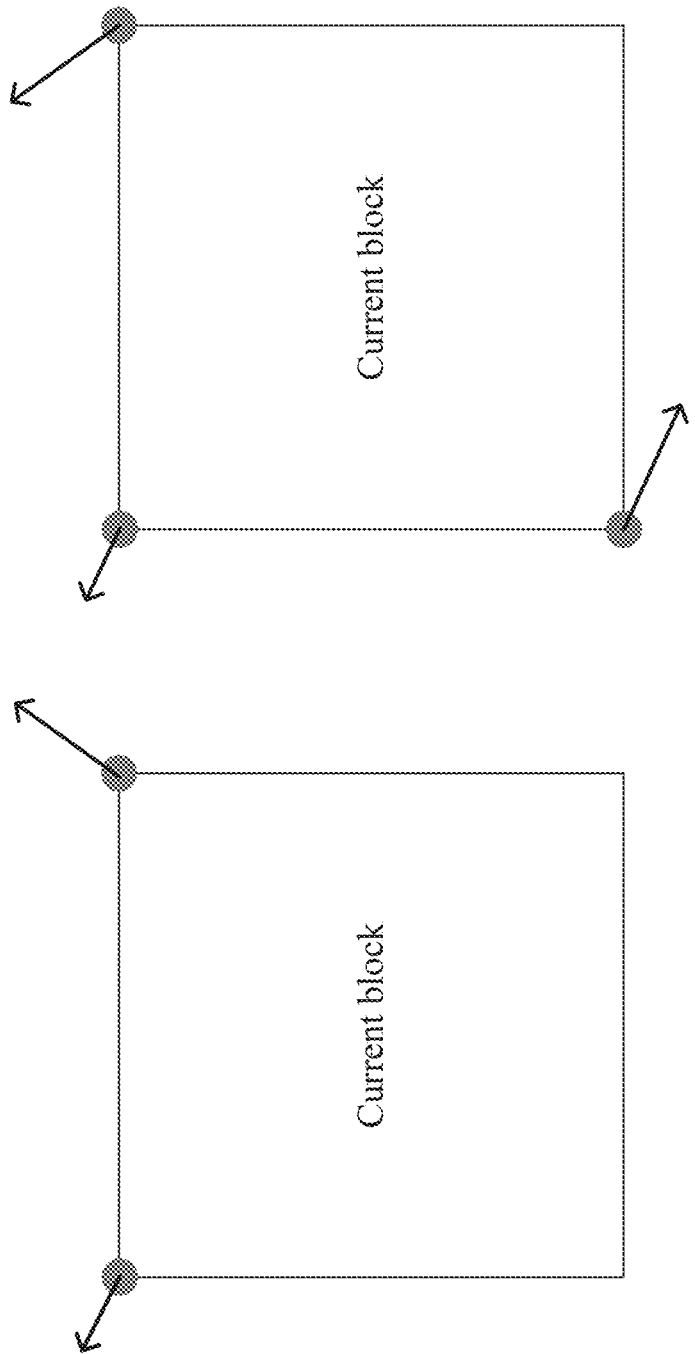
FIG. 7 is a schematic diagram illustrating exemplary control points based affine model, according to some embodiments of the present disclosure.

In AVS3, a block-based affine motion compensation prediction is applied. AFFINE can represent irregular motions such as zoom in/out, rotation, perspective motions like in the real world. FIG. 7 is a schematic diagram illustrating exemplary control points based affine model, according to some embodiments of the present disclosure. As shown in FIG. 7, the affine motion field of the block is described by motion information of two control point (4-parameter) or three control point motion vectors (6-parameter). AFFINE is applied to blocks larger than 16×16.

Figure 8:
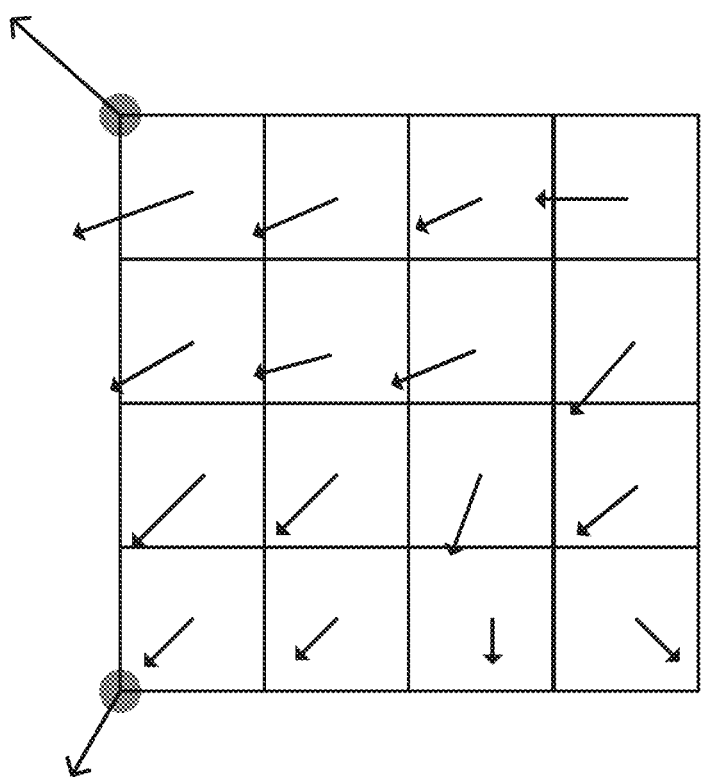
FIG. 8 is a schematic diagram illustrating exemplary motion vectors of the center sample of each subblock, according to some embodiments of the present disclosure.

FIG. 8 is a schematic diagram illustrating exemplary motion vectors of the center sample of each subblock, according to some embodiments of the present disclosure. To derive motion vector of each 8×8 luma subblock, the motion vector of the center sample of each subblock, as shown in FIG. 8, is calculated according to two or three control points (CPs), and rounded to 1/16 fraction accuracy. Then the motion compensation is performed to generate the prediction of each subblock with derived motion vectors.

There are also two affine motion inter prediction modes: AFFINE skip or direct mode and AFFINE inter mode.

For the AFFINE skip or direct mode, the motion vectors of the control points (CPMVs) of the current blocks are generated based on the motion information of the spatial neighboring blocks. There can be up to five AFFINE skip or direct candidates and an index is signaled to indicate the one to be used for the current block. The AFFINE skip or direct candidates are formed by the following three types:

1. Inherited affine skip/direct candidates that extrapolated from the CPMVs of the neighbour blocks;
2. Constructed affine skip/direct candidates CPMVs that are derived using the translational MVs of the neighbour blocks; and
3. Zero motions vectors.

There can be a maximum of two inherited affine candidates, which are derived from affine motion model of the neighboring blocks. When a neighboring affine block is identified, its control point motion vectors are used to derive the CPMV candidate in the affine skip or direct list of the current block. Constructed affine candidate means the candidate is constructed by combining the neighbor motion information of each control point. The motion information for the control points is derived from the specified spatial neighbors and temporal neighbor shown in FIG. 5. $CPMV_k$ (k=1, 2, 3, 4) represents the motion vector of k-th control point $CP_k$. For $CPMV_1$, the A→B→D blocks are checked and the MV of the first available block is used. For $CPMV_2$, the G→C blocks are checked and for $CPMV_3$, the F block are used. For $CPMV_4$, temporal motion vector predictor (TMVP) is used as $CPMV_4$ if it's available. After MVs of four control points are attained, affine skip/direct candidates are constructed based on the motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate.

After inherited affine skip or direct candidates and constructed affine skip or direct candidates are checked, if the list is still not full, zero MV(s) are inserted to the end of the list.

For the AFFINE inter mode, the difference of the CPMVs of current block and their predictors (CPMVPs) is signalled in the bitstream.

The BGC is applied to a bi-prediction inter coded block if it satisfies all the BGC application conditions. However, the existing design makes the application of BGC have received many restrictions. For example, the BGC cannot be applied to a skip or direct mode coded block even if it is a bi-prediction inter mode. As a result, the BGC cannot be applied to coding tools that are based on skip or direct candidates, such as UMVE, InterPF and the like. In addition, the BGC cannot be applied to blocks in which display order of the current frame is not between the two reference frames. Thus, the BGC cannot be applied to low-delay frames and is disabled in low-delay configuration. Moreover, the BGC cannot be applied to a chroma block.

Accordingly, the current BGC design is not suitable for the above conditions. Moreover, the restrictions above may have a negative impact on the coding performance of BGC.

The present disclosure provides solution to some or all of the above problems. The disclosed embodiments of the present disclosure can improve the coding performance of BGC and make it more widely used in different conditions. The following exemplary method is provided to address the above-mentioned problems.

Figure 9:
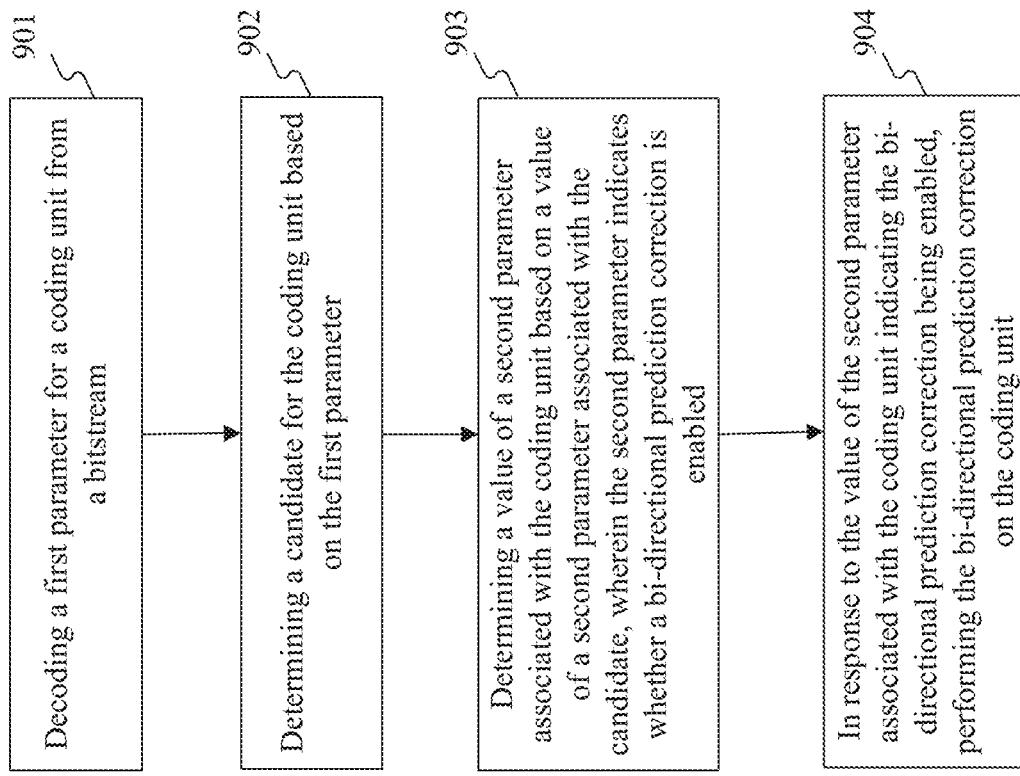
FIG. 9 is a flowchart of an exemplary video decoding method, according to some embodiments of the present disclosure.
Figure 10:
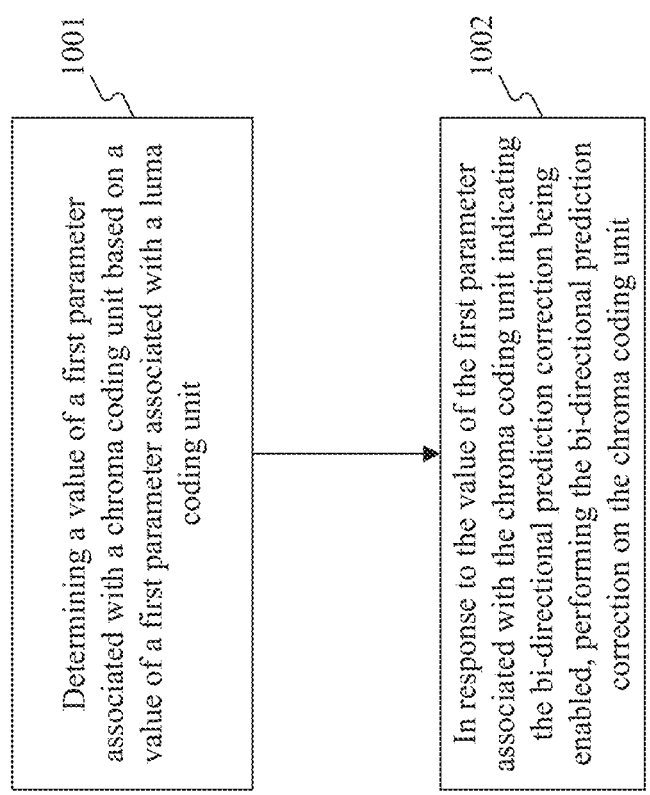
FIG. 10 is a flowchart of an exemplary video decoding method, according to some embodiments of the present disclosure.
Figure 11:
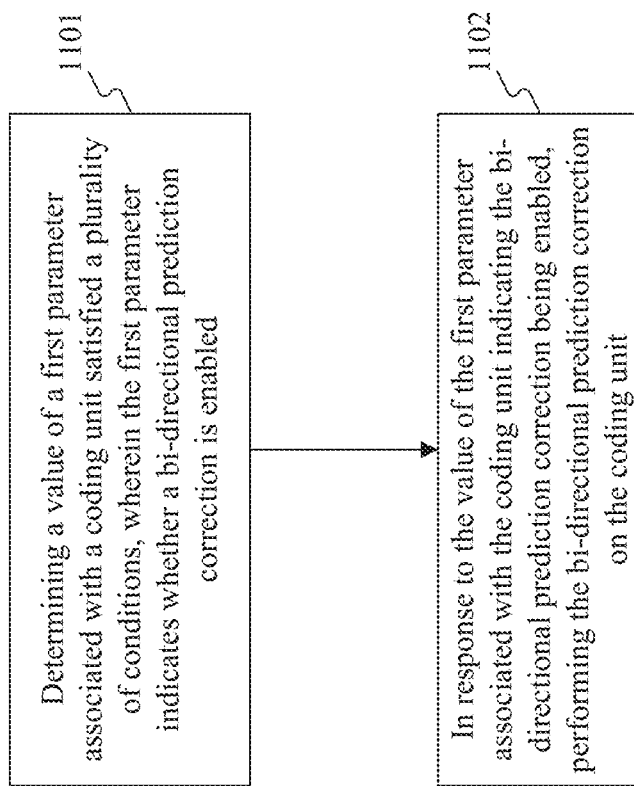
FIG. 11 is a flowchart of an exemplary video decoding method, according to some embodiments of the present disclosure.
Figure 12:
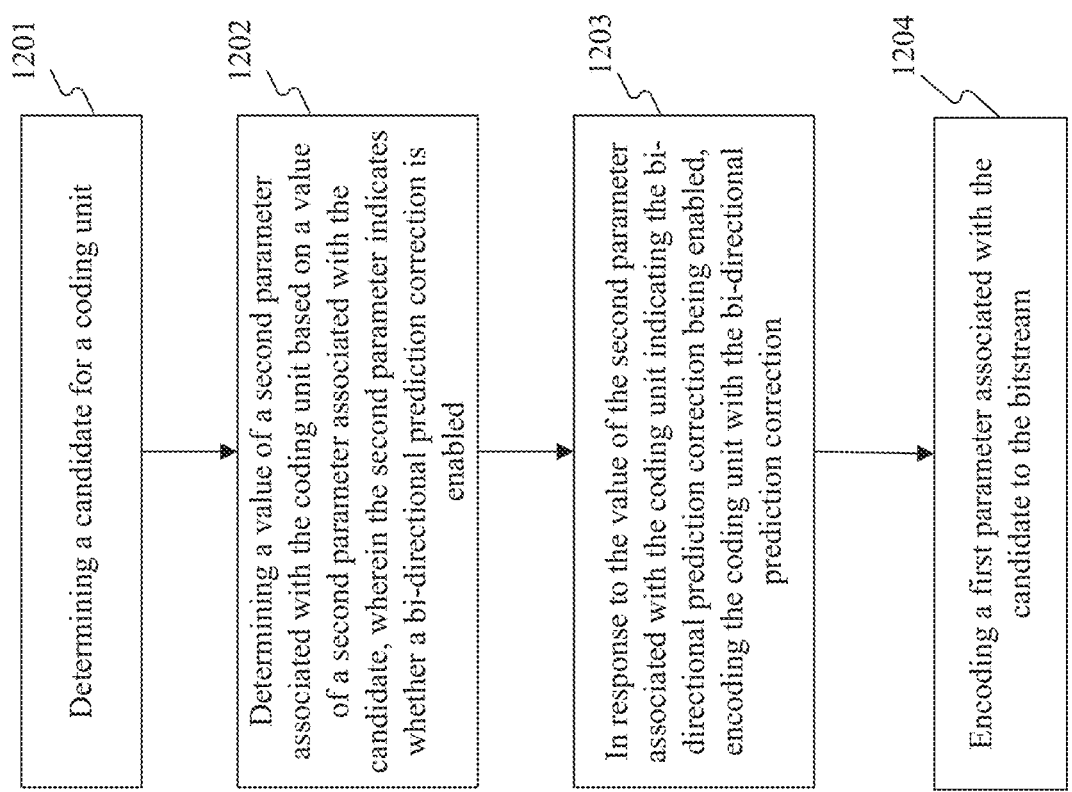
FIG. 12 is a flowchart of an exemplary video encoding method, according to some embodiments of the present disclosure.
Figure 13:
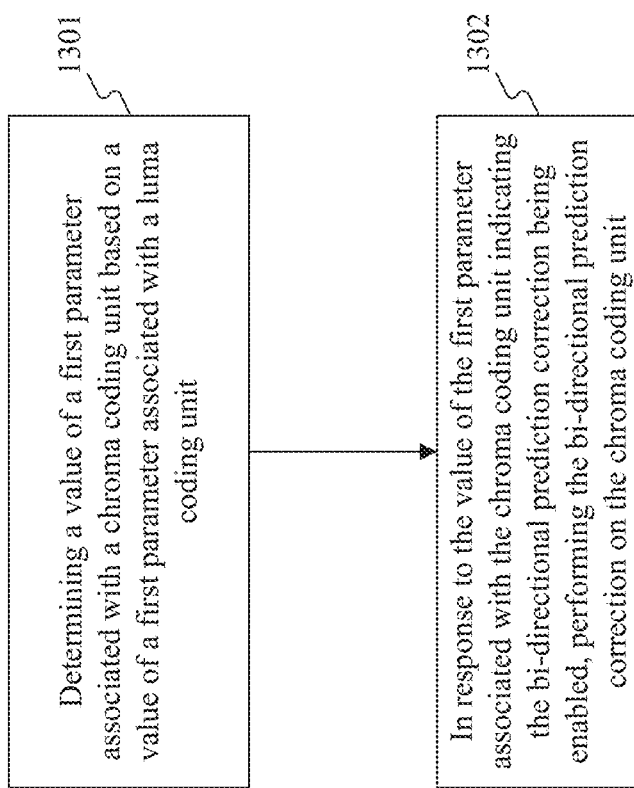
FIG. 13 is a flowchart of an exemplary video encoding method, according to some embodiments of the present disclosure.
Figure 14:
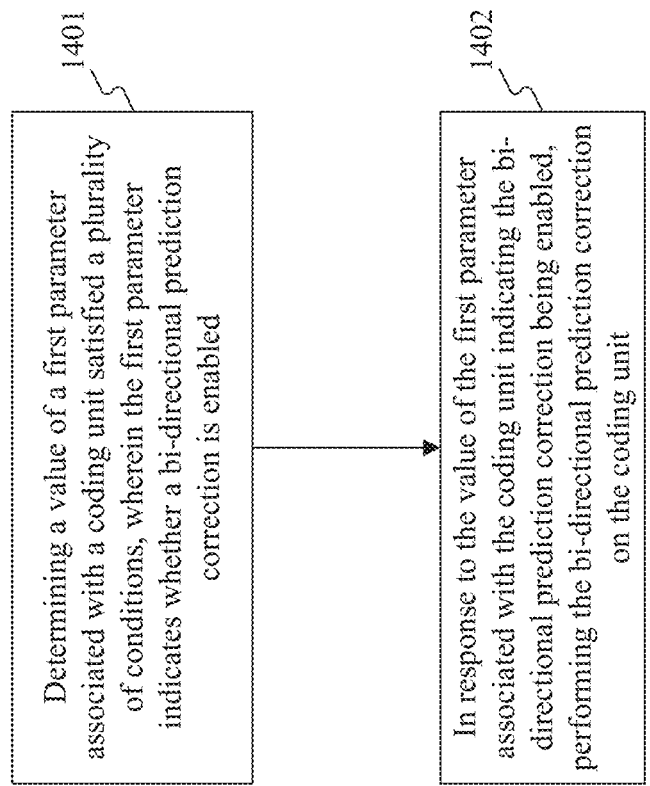
FIG. 14 is a flowchart of an exemplary video encoding method, according to some embodiments of the present disclosure.

FIGS. 9-11 are flowcharts of exemplary video decoding methods, according to some embodiments of the present disclosure. The methods can be performed by a decoder (e.g., by process 300A of FIG. 3A or 300B of FIG. 3B). FIGS. 12-14 are flowcharts of exemplary video encoding methods, according to some embodiments of the present disclosure. The methods can be performed by an encoder (e.g., by process 200A of FIG. 2A or 200B of FIG. 2B). The methods of FIGS. 9-14 can be performed by one or more software or hardware components of an apparatus (e.g., apparatus 400 of FIG. 4). For example, a processor (e.g., processor 402 of FIG. 4) can perform the method in FIG. 5. In some embodiments, the method can be implemented by a computer program product, embodied in a computer-readable medium, including computer-executable instructions, such as program code, executed by computers (e.g., apparatus 400 of FIG. 4).

Some embodiments provided the present disclosure are directed to extend the BGC correct methods. As discussed above, there are two correction methods to correct the bi-directional prediction block in BGC, represented by BgcIdx=0 and BgcIdx=1, respectively. However, the two methods may not be enough to represent the relationships between $P_0$, $P_1$, and the original signal of the current block. In some embodiments of the present disclosure, the BGC correction methods can be extended. The decoding method of FIG. 9 and the encoding method of FIG. 12 are provided for the technical solutions.

The decoding method of FIG. 9 can include the following steps.

In step 901, a first parameter for a coding unit from a bitstream is decoded.

In step 902, a candidate for the coding unit is determined based on the first parameter. In some embodiments, the candidate is one of TMVP, SMVP, MVAP, HMVP, UMVE, InterPF, affine inherited, affine constructed, or zero affine candidates.

In step 903, a value of a second parameter associated with the coding unit is determined based on a value of a second parameter associated with the candidate. A second parameter indicates whether a bi-directional prediction correction is enabled. In some embodiments, the second parameter can be flag BgcFlag. In some embodiments, the value of the second parameter associated with the coding unit is equal to the value of the second parameter associated with the candidate.

In step 904, in response to the value of the second parameter associated with the coding unit indicating the bi-directional prediction correction being enabled, the bi-directional prediction correction is performed on the coding unit.

In some embodiments, a value of a third parameter associated with the coding unit is determined based on a value of a third parameter associated with the candidate, wherein the third parameter associated with the coding unit indicates that one of bi-directional prediction correction methods is performed. The third parameter can be BgcIdx.

The encoding method of FIG. 12 can include the following steps.

In step 1201, a candidate is determined for a coding unit.

In step 1202, a value of a second parameter associated with the coding unit is determined based on a value of a second parameter associated with the candidate, wherein the second parameter indicates whether a bi-directional prediction correction is enabled.

In step 1203, in response to the value of the second parameter associated with the coding unit indicating the bi-directional prediction correction being enabled, the coding unit is encoded with the bi-directional prediction correction.

In step 1204, a first parameter associated with the candidate to the bitstream is encoded.

In some embodiments, the corrected prediction block Pred is determined based on the following equation:

$$Pred = \begin{cases} Pred_{BI}, & BgcFlag = 0 \\ Pred_{BI} + ((Pred_1 - Pred_0) \gg m), & BgcFlag = 1, BgcIdx = 0 \\ Pred_{BI} + ((Pred_1 - Pred_0) \gg n), & BgcFlag = 1, BgcIdx = 1 \end{cases} \quad (Eq. 6)$$

where m and n are two different correct intensity factors and can be set to any non-negative integer values to form two different correction methods. In one example, m and n are set to 3 and 2, respectively.

In some embodiments, the corrected prediction block Pred is determined based on the following equation:

$$Pred = \begin{cases} Pred_{BI}, & BgcFlag = 0 \\ Pred_{BI} + ((Pred_1 - Pred_0) \gg m), & BgcFlag = 1, BgcIdx = 0 \\ Pred_{BI} + ((Pred_0 - Pred_1) \gg m), & BgcFlag = 1, BgcIdx = 1 \\ Pred_{BI} + ((Pred_1 - Pred_0) \gg n), & BgcFlag = 1, BgcIdx = 2 \\ Pred_{BI} + ((Pred_0 - Pred_1) \gg n), & BgcFlag = 1, BgcIdx = 3 \end{cases} \quad (Eq. 7)$$

where m and n are two different correct intensity factors and can be set to any non-negative integer value to form the four different correction methods. In one example, m and n are set to 3 and 2, respectively. In this way, there are four BGC correction methods, represented by BgcIdx=0, BgcIdx=1, BgcIdx=2, and BgcIdx=3, respectively.

When the flag BgcFlag is true, the index BgcIdx can be signaled using context coded bins and/or bypass bins. For example, the 4 BgcIdxes can be signaled with two fixed bins as shown in Table 3. All the bins are coded with bypass bins or context bins.

TABLE 3

| Binary representation of the BgcIdx with fixed bins | | | | |
| --- | --- | --- | --- | --- |
| BgcIdx | 0 | 1 | 2 | 3 |
| Codeword | 00 | 01 | 10 | 11 |

For example, the 4 BgcIdxes can be signaled with unary truncated bins as shown in Table 4. All the bins are coded with bypass bins.

TABLE 4

| Binary representation of the BgcIdx with unary truncated bins | | | | |
| --- | --- | --- | --- | --- |
| BgcIdx | 0 | 1 | 2 | 3 |
| Codeword | 0 | 10 | 110 | 111 |

In some embodiments, the corrected prediction block Pred is determined based on the following equation:

$$Pred = \begin{cases} Pred_{BI}, & BgcFlag = 0 \\ Pred_{BI} + (p*(Pred_1 - Pred_0) \gg t), & BgcFlag = 1, BgcIdx = 0 \\ Pred_{BI} + (q*(Pred_0 - Pred_1) \gg u), & BgcFlag = 1, BgcIdx = 1 \\ Pred_{BI} + (r*(Pred_1 - Pred_0) \gg v), & BgcFlag = 1, BgcIdx = 2 \\ Pred_{BI} + (s*(Pred_0 - Pred_1) \gg w), & BgcFlag = 1, BgcIdx = 3 \end{cases} \quad (\text{Eq. 8})$$

where the factors p, q, r, and s can be set to any positive integer value and the factors t, u, v, and w can be set to any positive integer value to form four different correction methods. In one example, p, q, r, s, t, u, v, and w are set to 1, 1, 3, 3, 3, 3, 2, and 2, respectively. The signaling methods can be similar to those described above in connection with Table 3 and Table 4.

The extended BGC correction methods can fit more cases and improve the coding performance of the BGC.

In some embodiments of the present disclosure, for a skip or direct mode coded block, the BgcFlag and BgcIdx can be inferred from neighboring blocks based on the skip or direct candidate index, and then correct the prediction block by the obtained BgcFlag and BgcIdx, so that the BGC can be applied to skip or direct mode.

Specifically, in order to derive the BGC information used in the inter prediction in skip and direct modes, the BgcFlag and BgcIdx of the neighboring blocks are saved when deriving the skip or direct candidates in both encoder side and decoder side. The skip or direct candidates contain the motion vectors, reference indexes, BgcFlags, and BgcicIxes of the neighboring blocks. When the encoder selects a skip or direct candidate index or the decoder parses a skip or direct candidate index, it uses the corresponding motion vector(s) and reference index(es) to perform inter prediction first, and then uses the corresponding BgcFlags and BgcicIxes to correct the prediction block. In this way, the BGC can be applied to skip or direct mode without signaling the BgcFlag and BgcIdx. The skip or direct candidates include TMVP, SMVP, MVAP, and HMVP. The BGC can be applied to one or more types of motion vector predictors.

In some embodiments, the BGC is applied to the bi-prediction SMVP and HMVP in the following manner:

For TMVP, the corresponding BgcFlag and BgcIdx are set to 0;

For bi-prediction SMVP, the corresponding BgcFlag and BgcIdx are inherited from the spatial neighboring block that obtained the bi-prediction SMVP; for the two uni-prediction SMVP, the corresponding BgcFlag and BgcIdx are set to 0;

For MVAP, the corresponding BgcFlag and BgcIdx are set to 0; and

For HMVP, when deriving the HMVP table, the BGC information of the previously encoded or decoded inter blocks are also added to the last entry of a HMVP table. The corresponding BgcFlag and BgcIdx are inherited from the HMVP table.

Some embodiments of the present disclosure can extend BGC to skip or direct mode coded blocks and improve the coding performance.

In some embodiments of the present disclosure, BGC can be combined with other coding tools based on the skip or direct candidates.

In some embodiments, the BGC can be combined with UMVE. As discussed above, for each skip or direct candidate index, a corresponding BgcFlag and a corresponding BgcFlag is derived. For a UMVE coded block, the BgcFlag and BgcIdx can be inherited from the corresponding BgcFlag and BgcIdx based on the skip or direct candidate index of the base motion vector.

In some embodiments, the BGC can be combined with InterPF. As discussed above, for each skip or direct candidate index, a corresponding BgcFlag and a corresponding BgcIdx are derived. For an InterPF coded block, the BgcFlag and BgcIdx can be inherited from the corresponding BgcFlag and BgcIdx based on the skip or direct candidate index.

For example, the unfiltered current prediction block is corrected with the BgcFlag and BgcIdx first. Then the corrected current prediction block is used for the inter filter to get the final current prediction block.

For another example, the unfiltered current prediction block is not corrected. The filter operation of the current block is not changed. The inherited BgcFlag and BgcIdx is prepared for other blocks to inherit.

In some embodiments, BGC can be combined with AFFINE skip/direct mode.

For example, for the AFFINE skip/direct mode, the BgcFlag and BgcIdx of the current block is explicitly signaled. The encoder can choose any value of BgcFlag and BgcIdx allowed and signal the value chosen in the bitstream. As a first example, the BgcFlag and BgcIdx of all kinds of affine skip or direct candidate including inherited affine skip or direct candidate, constructed affine skip or direct candidate and zero motion vector are selected by the encoder and signaled in the bitstream. As a second example, the BgcFlag and BgcIdx of some of affine skip or direct candidate are selected by the encoder and signaled in the bitstream. For example, only for constructed affine skip or direct candidate, the BgcFlag and BgcIdx can be selected and for other candidates (e.g., inherited affine skip or direct candidate), the BgcFlag and BgcIdx are inferred from the neighbor blocks or fix to a default value.

For another example, for the AFFINE skip/direct mode the BgcFlag and BgcIdx are inferred from the neighboring blocks.

For inherited affine skip or direct candidate, the BgcFlag and BgcIdx of the neighbor block are also saved, so that the BgcFlag and BgcIdx of the current block can be inherited from the BgcFlag and BgcIdx of the neighbour block from which the used CPMV is borrowed, respectively.

For each of constructed affine skip or direct candidate, the BgcFlag and BgcIdx are derived according to the CPs of this constructed affine skip or direct candidate and if this constructed affine skip/direct candidate is used for a block, the BgcFlag and BgcIdx derived are also used for the block. For each CP, neighbor blocks are used to derive the corresponding CPMV. The neighbor blocks are also used to derive the BgcFlag and BgcIdx of the CPs. For $CP_1$, the A→B→D blocks in FIG. 4 are checked and the MV, BgcFlag and BgcIdx of the first available block is saved. For $CP_2$, the G→C blocks are checked and the MV, BgcFlag and BgcIdx of the first available block is saved. For $CP_3$, the MV, BgcFlag and BgcIdx of block F is saved. For $CP_4$, temporal motion vector predictor (TMVP) is used as $CP_4$ if it's available, and the BgcFlag and BgcIdx of $CP_4$ are set to 0. Thus, a rule needs to be specified to derive one BgcFlag and one BgcIdx for a constructed affine skip or direct candidate from at most 4 BgcFlags and BgcIdxes.

In a first example, if all of the CPs have the same BgcFlag and BgcIdx, then the BgcFlag and BgcIdx are used for the constructed affine skip or direct candidate; otherwise Bgc-Flag of the current block is set to 0.

In a second example, the BgcFlag and BgcIdx of a constructed affine skip or direct candidate are the most probable BgcFlag and BgcIdx, respectively. And the most probable BgcFlag and BgcIdx are the BgcFlag and BgcIdx which are used by the most CPs of the constructed affine skip or direct candidate, respectively.

In a third example, for the normal bi-prediction inter mode, it can be treated as an equal weight average of $Pred_0$ and $Pred_1$. Use bgcweight>>k to represent the weight of $Pred_0$, the different correction methods can be marked with bgcweight based on the following equation:

$$Pred = \begin{cases} Pred_{BI}, & BgcFlag = 0 & bgcweight = 4 \\ Pred_{BI} + ((Pred_1 - Pred_0) \gg k), & BgcFlag = 1, BgcIdx = 0, & bgcweight = 3 \\ Pred_{BI} + ((Pred_0 - Pred_1) \gg k), & BgcFlag = 1, BgcIdx = 1, & bgcweight = 5 \end{cases} \quad (Eq.\ 9)$$

The bgcweight of a constructed affine skip or direct candidate is one which is the closest to equal weight (bgcweight=4) among all the bgcweights of CPs of the constructed affine skip or direct candidate.

For example, for constructed affine merge candidate with 2 CPs ($CP_a$, $CP_b$), $Diff_a = |CP_a\ bgcweight - equal\ weight|$ $Diff_b = |CP_b\ bgcweight - equal\ weight|$ if($Diff_a <= Diff_b$)

the affine skip/direct candidate bgcweight=$CP_a$ bgcweight else the affine skip/direct candidate bgcweight=$CP_b$ bgcweight.

Then with the affine skip or direct candidate bgcweight, the BgcFlag and BgcIdx can be derived.

In a fourth example, the average of the CP bgcweight is used as the bgcweight of constructed affine skip or direct candidate. Then with the affine skip or direct candidate bgcweight, the BgcFlag and BgcIdx can be derived.

In a fifth example, the BgcFlag and BgcIdx of the first CP of the constructed affine skip/direct candidate is used. Specifically, for the constructed affine skip/direct candidates {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_1$, $CPMV_2$} and {$CPMV_1$, $CPMV_3$}, the BgcFlag and BgcIdx of $CP_1$ is used; for the constructed affine skip/direct candidate {$CPMV_2$, $CPMV_3$, $CPMV_4$}, the BgcFlag and BgcIdx of $CP_2$ is used.

In the existing design, the BGC is disabled in low-delay configuration. Some embodiments of the present disclosure can remove the restrictions on the display order between the two reference frames and the current frame, so that the BGC can be applied to low-delay pictures. The BGC methods used for low-delay pictures may be the same or different to those used for non-low-delay pictures. Moreover, some embodiments of the present disclosure can be used for the low-delay pictures to improve the coding performance.

The decoding method of FIG. 11 and the encoding method of FIG. 14 can be provided for the technical solutions.

The method of FIG. 11 can include the following steps.

In step 1101, a value of a first parameter associated with a coding unit satisfied a plurality of conditions is determined, wherein the first parameter indicates whether a bi-directional prediction correction is enabled.

In some embodiments, the plurality of conditions comprising: determining two reference picture lists of the coding unit; determining whether reference pictures in the two reference picture lists are prior to a current picture associated with the coding unit in a display order; and in response to the reference pictures in the two reference picture lists being prior to the current picture associated with the coding unit in the display order, determining that the coding unit satisfies the plurality of conditions.

In step 1102, in response to the value of the first parameter associated with the coding unit indicating the bi-directional prediction correction being enabled, the bi-directional prediction correction on the coding unit is performed.

In some embodiments, a value of a second parameter associated with the coding unit is determined, wherein the second parameter associated with the coding unit indicates that one of bi-directional prediction correction methods is performed on the coding unit. The second parameter can be BgcIdx.

In some embodiments, the following steps can be performed: obtaining a first and a second predictions for the coding unit, wherein the first and the second predictions are predicted using motions of the coding unit; determining a third prediction by applying a correct intensity factor to a difference between the first and the second predictions; and decoding the coding unit using the first, second and third predictions by averaging the first and the second predictions and adding the third prediction.

In some embodiments, the difference between the first and the second predictions is one of: the value of the difference between the first and the second predictions is equal to the first prediction minus the second prediction; or the value of the difference between the first and the second predictions is equal to the second prediction minus the first prediction.

In some embodiments, the correct intensity factor is ⅛.

The encoding method of FIG. 14 can include the following steps.

In step 1401, a value of a first parameter associated with a coding unit satisfied a plurality of conditions is determined, wherein the first parameter indicates whether a bi-directional prediction correction is enabled.

In step 1402, in response to the value of the first parameter associated with the coding unit indicating the bi-directional prediction correction being enabled, the bi-directional prediction correction on the coding unit is performed.

In some embodiments, the restriction that the display order of the current frame must be between the display order of the two reference frames is removed. Both the low-delay and non-low-delay pictures can apply the BGC to bi-prediction blocks in the same way according to the Eq. 10 below:

$$Pred = \begin{cases} Pred_{BI}, & BgcFlag = 0 \\ Pred_{BI} + ((Pred_1 - Pred_0) \gg k), & BgcFlag = 1, BgcIdx = 0 \\ Pred_{BI} + ((Pred_0 - Pred_1) \gg k), & BgcFlag = 1, BgcIdx = 1 \end{cases} \quad (Eq.\ 10)$$

where $Pred_0$ and $Pred_1$ represent the prediction blocks obtained by the first motion vector and the section motion vector, respectively.

In some embodiments, the restriction that the display order of the current frame is between the display order of the two reference frames is also removed, while the low-delay and non-low-delay pictures apply the BGC to bi-prediction blocks in different ways. For the non-low-delay-pictures, the correction methods are the same as described above. For the low-delay pictures, the correction factor can be set to 2 or other non-negative integer values except 3.

In some embodiments, for the low-delay pictures, the correction methods can be determined based on the following equation:

$$Pred = \begin{cases} Pred_{BI}, & BgcFlag = 0 \\ Pred_{BI} + ((Pred_1 - Pred_0) \gg k), & BgcFlag = 1 \end{cases} \quad \text{(Eq. 11)}$$

where k is set to 3. Meanwhile, the factors k can be set to any non-negative integer value.

In some embodiments, for the low-delay pictures, the correction methods can be determined based on the following equation:

$$Pred = \quad \text{(Eq. 12)}$$
$$\begin{cases} Pred_{BI}, & BgcFlag = 0 \\ Pred_{BI} + ((Pred_1 - Pred_0) \gg m), & BgcFlag = 1, BgcIdx = 0 \\ Pred_{BI} + ((Pred_1 - Pred_0) \gg n), & BgcFlag = 1, BgcIdx = 1 \end{cases}$$

where m and n are set to 3 and 2, respectively. Meanwhile, the factors m and n can be set to any non-negative integer value.

In some embodiments, for the low-delay pictures, the correction methods can be determined based on the following equation:

$$Pred = \quad \text{(Eq. 13)}$$
$$\begin{cases} Pred_{BI}, & BgcFlag = 0 \\ Pred_{BI} + ((Pred_1 - Pred_0) \gg m), & BgcFlag = 1, BgcIdx = 0 \\ Pred_{BI} + ((Pred_0 - Pred_1) \gg m), & BgcFlag = 1, BgcIdx = 1 \\ Pred_{BI} + ((Pred_1 - Pred_0) \gg n), & BgcFlag = 1, BgcIdx = 2 \\ Pred_{BI} + ((Pred_0 - Pred_1) \gg n), & BgcFlag = 1, BgcIdx = 3 \end{cases}$$

where m and n are set to 3 and 2, respectively. Meanwhile, the factors m and n can be set to any non-negative integer value to form four different correction methods. The signaling method can be the same as described above.

In some embodiments, for the low-delay pictures, the correction methods can be determined based on the following equation:

$$Pred = \quad \text{(Eq. 14)}$$
$$\begin{cases} Pred_{BI}, & BgcFlag = 0 \\ Pred_{BI} + (p*(Pred_1 - Pred_0) \gg t), & BgcFlag = 1, BgcIdx = 0 \\ Pred_{BI} + (q*(Pred_0 - Pred_1) \gg u), & BgcFlag = 1, BgcIdx = 1 \\ Pred_{BI} + (r*(Pred_1 - Pred_0) \gg v), & BgcFlag = 1, BgcIdx = 2 \\ Pred_{BI} + (s*(Pred_0 - Pred_1) \gg w), & BgcFlag = 1, BgcIdx = 3 \end{cases}$$

where p, q, r, s, t, u, v, and w are set to 1, 1, 3, 3, 3, 3, 2, and 2, respectively. Meanwhile, the factors p, q, r, and s can be set to any positive integer value and the factors t, u, v, and w can be set to any positive integer value to form four different correction methods. The signaling method can be the same as described above. The disclosed method can extend BGC to low-delay pictures so that it can be enabled in low-delay configuration. Meanwhile, it can improve the coding performance in both the random access and low-delay configurations.

In conventional designs, the BGC is disabled for chroma blocks. Some embodiments of the present disclosure can use the BgcFlag and BgcIdx inherited from the co-located luma block to correct the current prediction chroma block in the same way as described above when the BgcFlag is equal to 1. In this way, the BGC is extended to the chroma blocks and the coding performance can be improved.

The decoding method of FIG. 10 and the encoding method of FIG. 13 are provided for addressing the above issue. The decoding method of FIG. 10 can include the following steps.

In step 1001, a value of a first parameter associated with a chroma coding unit is determined based on a value of a first parameter associated with a luma coding unit, wherein one first parameter indicates whether a bi-directional prediction correction is enabled. In some embodiments, the luma coding unit is a collocated block of the chroma coding unit.

In step 1002, in response to the value of the first parameter associated with the chroma coding unit indicating the bi-directional prediction correction being enabled, the bi-directional prediction correction is performed on the chroma coding unit.

In some embodiments, a value of a second parameter associated with the chroma coding unit is determined based on a value of a second parameter associated with the luma coding unit, wherein one second parameter indicates that one of bi-directional prediction correction methods is performed on the chroma coding unit.

In some embodiments, the first and the second parameters associated with the luma coding unit are decoded from a bitstream.

In some embodiments, the first and the second parameters associated with the luma coding unit are inherited from a candidate determined by a third parameter decoded from a bitstream.

The encoding method of FIG. 13 can include the following steps.

In step 1301, a value of a first parameter associated with a chroma coding unit is determined based on a value of a first parameter associated with a luma coding unit, wherein one first parameter indicates whether a bi-directional prediction correction is enabled.

In step 1302, in response to the value of the first parameter associated with the chroma coding unit indicating the bidirectional prediction correction being enabled, the bi-directional prediction correction on the chroma coding unit is performed.

It is contemplated that the above embodiments of the present disclosure can be combined to improve the coding performance.

Some embodiments of the present disclosure can extend the BGC to uni-prediction block to compensation the luminance changes between pictures.

In some embodiments, when a block is coded using uni-prediction mode, a flag is signaled to indicate whether a weight is applied to prediction samples. When the flag is equal to 1, a weight index is signaled to indicate which weight is applied to the prediction samples. When the flag is equal to 0, the prediction samples do not apply any weight and directly add to residuals. For example, the current luminance prediction block can be corrected or updated with a uniweight based on the following equation:

$$Pred = \text{clip}(Pred_{uni} * uniweight) \qquad \text{(Eq. 15)}$$

where uniweight∈ [6/8, 7/8, 9/8, 10/8]. The uniweight is a positive value.

In some embodiments, an additional offset index is signaled to indicate which offset is applied to the prediction samples when the flag indicates whether to correct the prediction samples is equal to 1. For example, the current luminance prediction block can be corrected or updated with a uniweight and a unioffset based on the following equation:

$$Pred = \text{clip}(Pred_{uni} * uniweight + unioffset), \qquad \text{(Eq. 16)}$$

where uniweight∈ [6/8, 7/8, 9/8, 10/8], unioffset∈ [−20, −10, 0, 10, 20]. The uniweight is a positive value and the unioffset is a integer value.

In addition, the flag and the index can be inherited from the neighboring blocks for a skip or direct coded block.

It is appreciated that, one of ordinary skill in the art can combine some of the described embodiments into one embodiment.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The disclosed embodiments may further be described using the following clauses:

1. A video decoding method, comprising:
   decoding a first parameter for a coding unit from a bitstream, and determining a candidate for the coding unit based on the first parameter;
   determining a value of a second parameter associated with the coding unit based on a value of a second parameter associated with the candidate, wherein the second parameter indicates whether a bi-directional prediction correction is enabled; and
   in response to the value of the second parameter associated with the coding unit indicating the bi-directional prediction correction being enabled, performing the bi-directional prediction correction on the coding unit.

2. The method according to clause 1, further comprising:
   determining that the value of the second parameter associated with the coding unit is equal to the value of the second parameter associated with the candidate.

3. The method according to clause 1, further comprising:
   determining a value of a third parameter associated with the coding unit based on a value of a third parameter associated with the candidate, wherein the third parameter indicates that one of bi-directional prediction correction methods is performed.

4. The method according to any one of clauses 1-3, wherein the candidate is one of TMVP, SMVP, MVAP, HMVP, UMVE, InterPF, affine inherited, affine constructed, or zero affine candidates.

5. The method according to any one of clauses 1 and 4, wherein the candidate is a TMVP, a MVAP, or a zero affine candidate, determining the value of the second parameter associated with the coding unit based on the value of the second parameter associated with the candidate further comprises:
   setting the value of the second parameter associated with the coding unit to be disabled, and disabling the bi-directional prediction correction for the coding unit.

6. The method according to the any one of clauses 1 and 4, wherein the candidate is an affine constructed candidate, determining the value of the second parameter associated with the coding unit based on the value of the second parameter associated with the candidate further comprises:
determining a plurality of control points for the coding unit, wherein the plurality of control points includes at least a first control point;
determining that the values of the second and the third parameters associated with the coding unit are equal to values of a second and a third parameters associated with the first control point, respectively.

7. The method according to any one of clauses 1-6, wherein the second parameter is a flag and a third parameter is an index.

8. A video decoding method, comprising:
determining a value of a fourth parameter associated with a chroma coding unit based on a value of a fourth parameter associated with a luma coding unit, wherein the fourth parameter indicates whether a bi-directional prediction correction is enabled; and
in response to the value of the fourth parameter associated with the chroma coding unit indicating the bi-directional prediction correction being enabled, performing the bi-directional prediction correction on the chroma coding unit.

9. The method according to clause 8, wherein
the luma coding unit is a collocated block of the chroma coding unit.

10. The method according to clause 8, further comprising:
determining a value of a fifth parameter associated with the chroma coding unit based on a value of a fifth parameter associated with the luma coding unit, wherein the fifth parameter indicates that one of bi-directional prediction correction methods is performed on the chroma coding unit.

11. The method according to any one of clauses 8-10, wherein:
the fourth and the fifth parameters associated with the luma coding unit are decoded from a bitstream.

12. The method according to any one of clauses 8-10, wherein:
the fourth and the fifth parameters associated with the luma coding unit are inherited from a candidate determined by a sixth parameter decoded from a bitstream.

13. A video decoding method, comprising:
determining a value of a seventh parameter associated with a coding unit satisfied a plurality of conditions, wherein the seventh parameter indicates whether a bi-directional prediction correction is enabled; and
in response to the value of the seventh parameter associated with the coding unit indicating the bi-directional prediction correction being enabled, performing the bi-directional prediction correction on the coding unit.

14. The method according to clause 13, wherein the plurality of conditions comprising:
determining two reference picture lists of the coding unit;
determining whether reference pictures in the two reference picture lists are prior to a current picture associated with the coding unit in a display order; and
in response to the reference pictures in the two reference picture lists being prior to the current picture associated with the coding unit in the display order, determining that the coding unit satisfies the plurality of conditions.

15. The method according to clause 13, further comprising:
determining a value of an eighth parameter associated with the coding unit, wherein the eighth parameter indicates that one of bi-directional prediction correction methods is performed on the coding unit.

16. The method according to clause 13, further comprising:
obtaining a first and a second predictions for the coding unit, wherein the first and the second predictions are predicted using motions of the coding unit;
determining a third prediction by applying a correct intensity factor to a difference between the first and the second predictions; and
decoding the coding unit using the first, second and third predictions by averaging the first and the second predictions and adding the third prediction.

17. The method according to clause 16, wherein the difference between the first and the second predictions is one of:
the value of the difference between the first and the second predictions is equal to the first prediction minus the second prediction; or
the value of the difference between the first and the second predictions is equal to the second prediction minus the first prediction.

18. The method according to clause 16, wherein the correct intensity factor is ⅛.

19. A video encoding method, comprising:
determining a candidate for a coding unit;
determining a value of a second parameter associated with the coding unit based on a value of a second parameter associated with the candidate, wherein the second parameter indicates whether a bi-directional prediction correction is enabled;
in response to the value of the second parameter associated with the coding unit indicating the bi-directional prediction correction being enabled, encoding the coding unit with the bi-directional prediction correction; and
encoding a first parameter associated with the candidate to the bitstream.

20. The method according to clause 19, further comprising:
determining the value of the second parameter associated with the coding unit equal to the value of the second parameter associated with the candidate.

21. The method according to clause 19, further comprising:
determining a value of a third parameter associated with the coding unit based on a value of a third parameter associated with the candidate, wherein the third parameter indicates which one of bi-directional prediction correction methods is performed.

22. The method according to any one of clauses 19-21, wherein the candidate is one of TMVP, SMVP, MVAP, HMVP, UMVE, InterPF, affine inherited, affine constructed, or zero affine candidates.

23. The method according to clause 22, wherein the candidate being a TMVP, a MVAP, or a zero affine candidate, determining the value of the second parameter associated with the coding unit based on the value of the second parameter associated with the candidate further comprises:
setting the value of the second parameter associated with the coding unit to be disabled, and disabling the bi-directional prediction correction for the coding unit.

24. The method according to any one of clauses 19 and 22, wherein the candidate is an affine constructed candidate, determining the value of the second parameter associated with the coding unit based on the value of the second parameter associated with the candidate further comprises:
determining a plurality of control points for the coding unit, wherein the plurality of control points includes at least a first control point;
determining the values of the second and the third parameters associated with the coding unit equal to values of a second and a third parameters associated with the first control point, respectively.

25. The method according to any one of clauses 19-24, wherein the second parameter is a flag and a third parameter is an index.

26. A video encoding method, comprising:
determining a value of a fourth parameter associated with a chroma coding unit based on a value of a fourth parameter associated with a luma coding unit, wherein the fourth parameter indicates whether a bi-directional prediction correction is enabled;
in response to the value of the fourth parameter associated with the chroma coding unit indicating the bi-directional prediction correction being enabled, performing the bi-directional prediction correction on the chroma coding unit.

27. The method according to clause 26, wherein the luma coding unit is a collocated block of the chroma coding unit.

28. The method according to clause 26, further comprising:
determining a value of a fifth parameter associated with the chroma coding unit based on a value of a fifth parameter associated with the luma coding unit, wherein the fifth parameter indicates that one of bi-directional prediction correction methods is performed on the chroma coding unit.

29. The method according to any one of clauses 26-28, wherein
the fourth and the fifth parameters associated with the luma coding unit are encoded to a bitstream.

30. The method according to any one of clauses 26-28, further comprising:
determining a candidate for the luma coding unit;
inheriting the fourth and the fifth parameters associated with the luma coding unit the candidate, and
encoding a sixth parameter associated with the candidate to a bitstream.

31. A video encoding method, comprising:
determining a value of a seventh parameter associated with a coding unit satisfied a plurality of conditions, wherein the seventh parameter indicates whether a bi-directional prediction correction is enabled;
in response to the value of the seventh parameter associated with the coding unit indicating the bi-directional prediction correction being enabled, performing the bi-directional prediction correction on the coding unit.

32. The method according to clause 31, wherein the plurality of conditions comprising:
determining two reference picture lists of the coding unit;
determining whether all the reference pictures in the two reference picture lists are prior to a current picture associated with the coding unit in display order; and
in response to all the reference pictures in the two reference picture lists are prior to the current picture associated with the coding unit in display order, determining the coding unit to be satisfied the plurality of conditions.

33. The method according to clause 31, further comprising:
determining a value of an eighth parameter associated with the coding unit, wherein the eighth parameter indicates that one of bi-directional prediction correction methods is performed on the coding unit.

34. A video processing apparatus, comprising:
a memory storing a set of instructions; and
one or more processors configured to execute the set of instructions to cause the apparatus to perform:
decoding a first parameter for a coding unit from a bitstream, and determining a candidate for the coding unit based on the first parameter;
determining a value of a second parameter associated with the coding unit based on a value of a second parameter associated with the candidate, wherein the second parameter indicates whether a bi-directional prediction correction is enabled; and
in response to the value of the second parameter associated with the coding unit indicating the bi-directional prediction correction being enabled, performing the bi-directional prediction correction on the coding unit.

35. The apparatus according to clause 34, wherein the one or more processors configured to execute the set of instructions to cause the apparatus to further perform:
determining that the value of the second parameter associated with the coding unit is equal to the value of the second parameter associated with the candidate.

36. The apparatus according to clause 34, wherein the one or more processors configured to execute the set of instructions to cause the apparatus to further perform:
determining a value of a third parameter associated with the coding unit based on a value of a third parameter associated with the candidate, wherein the third parameter indicates that one of bi-directional prediction correction methods is performed.

37. The apparatus according to any one of clauses 34-36, wherein the candidate is one of TMVP, SMVP, MVAP, HMVP, UMVE, InterPF, affine inherited, affine constructed, or zero affine candidates.

38. The apparatus according to any one of clauses 34 and 37, wherein the candidate is a TMVP, a MVAP, or a zero affine candidate, determining the value of the second parameter associated with the coding unit based on the value of the second parameter associated with the candidate further comprises:
setting the value of the second parameter associated with the coding unit to be disabled, and disabling the bi-directional prediction correction for the coding unit.

39. The apparatus according to the any one of clauses 34 and 37, wherein the candidate is an affine constructed candidate, determining the value of the second parameter associated with the coding unit based on the value of the second parameter associated with the candidate further comprises:
determining a plurality of control points for the coding unit, wherein the plurality of control points includes at least a first control point;
determining that the values of the second and the third parameters associated with the coding unit are equal to values of a second and a third parameters associated with the first control point, respectively.

40. The apparatus according to any one of clauses 34-39, wherein the second parameter is a flag and a third parameter is an index.

41. A video decoding apparatus, comprising:
a memory storing a set of instructions; and
one or more processors configured to execute the set of instructions to cause the apparatus to perform:
determining a value of a fourth parameter associated with a chroma coding unit based on a value of a fourth parameter associated with a luma coding unit, wherein the fourth parameter indicates whether a bi-directional prediction correction is enabled;
in response to the value of the fourth parameter associated with the chroma coding unit indicating the bi-directional prediction correction being enabled, performing the bi-directional prediction correction on the chroma coding unit.

42. The apparatus according to clause 41, wherein the luma coding unit is a collocated block of the chroma coding unit.

43. The apparatus according to clause 41, wherein the one or more processors configured to execute the set of instructions to cause the apparatus to further perform:
determining a value of a fifth parameter associated with the chroma coding unit based on a value of a fifth parameter associated with the luma coding unit, wherein the fifth parameter indicates that one of bi-directional prediction correction methods is performed on the chroma coding unit.

44. The apparatus according to any one of clauses 41-43, wherein:
the fourth and the fifth parameters associated with the luma coding unit are decoded from a bitstream.

45. The apparatus according to any one of clauses 41-43, wherein:
the fourth and the fifth parameters associated with the luma coding unit are inherited from a candidate determined by a sixth parameter decoded from a bitstream.

46. A video decoding apparatus, comprising:
a memory storing a set of instructions; and
one or more processors configured to execute the set of instructions to cause the apparatus to perform:
determining a value of a seventh parameter associated with a coding unit satisfied a plurality of conditions, wherein the seventh parameter indicates whether a bi-directional prediction correction is enabled;
in response to the value of the seventh parameter associated with the coding unit indicating the bi-directional prediction correction being enabled, performing the bi-directional prediction correction on the coding unit.

47. The apparatus according to clause 46, wherein the plurality of conditions comprising:
determining two reference picture lists of the coding unit;
determining whether reference pictures in the two reference picture lists are prior to a current picture associated with the coding unit in a display order; and
in response to the reference pictures in the two reference picture lists being prior to the current picture associated with the coding unit in the display order, determining that the coding unit satisfies the plurality of conditions.

48. The apparatus according to clause 46, wherein the one or more processors configured to execute the set of instructions to cause the apparatus to further perform:
determining a value of an eighth parameter associated with the coding unit, wherein the eighth parameter indicates that one of bi-directional prediction correction methods is performed on the coding unit.

49. The apparatus according to clause 46, wherein the one or more processors configured to execute the set of instructions to cause the apparatus to further perform:
obtaining a first and a second predictions for the coding unit, wherein the first and the second predictions are predicted using motions of the coding unit;
determining a third prediction by applying a correct intensity factor to a difference between the first and the second predictions; and
decoding the coding unit using the first, second and third predictions by averaging the first and the second predictions and adding the third prediction.

50. The apparatus according to clause 49, wherein the difference between the first and the second predictions is one of:
the value of the difference between the first and the second predictions is equal to the first prediction minus the second prediction; or
the value of the difference between the first and the second predictions is equal to the second prediction minus the first prediction.

51. The apparatus according to clause 49, wherein the correct intensity factor is $\frac{1}{8}$.

52. A video encoding apparatus, comprising:
a memory storing a set of instructions; and
one or more processors configured to execute the set of instructions to cause the apparatus to perform:
determining a candidate for a coding unit;
determining a value of a second parameter associated with the coding unit based on a value of a second parameter associated with the candidate, wherein the second parameter indicates whether a bi-directional prediction correction is enabled;
in response to the value of the second parameter associated with the coding unit indicating the bi-directional prediction correction being enabled, encoding the coding unit with the bi-directional prediction correction; and
encoding a first parameter associated with the candidate to the bitstream.

53. The apparatus according to clause 52, wherein the one or more processors configured to execute the set of instructions to cause the apparatus to further perform:
determining the value of the second parameter associated with the coding unit equal to the value of the second parameter associated with the candidate.

54. The apparatus according to clause 52, wherein the one or more processors configured to execute the set of instructions to cause the apparatus to further perform:
determining a value of a third parameter associated with the coding unit based on a value of a third parameter associated with the candidate, wherein the third parameter indicates which one of bi-directional prediction correction methods is performed.

55. The apparatus according to any one of clauses 52-54, wherein the candidate is one of TMVP, SMVP, MVAP, HMVP, UMVE, InterPF, affine inherited, affine constructed, or zero affine candidates.

56. The apparatus according to clause 55, wherein the candidate being a TMVP, a MVAP, or a zero affine candidate, determining the value of the second parameter associated with the coding unit based on the value of the second parameter associated with the candidate further comprises:
setting the value of the second parameter associated with the coding unit to be disabled, and disabling the bi-directional prediction correction for the coding unit.

57. The apparatus according to any one of clauses 52 and 55, wherein the candidate is an affine constructed candidate, determining the value of the second parameter associated with the coding unit based on the value of the second parameter associated with the candidate further comprises:

determining a plurality of control points for the coding unit, wherein the plurality of control points includes at least a first control point;

determining the values of the second and the third parameters associated with the coding unit equal to values of a second and a third parameters associated with the first control point, respectively.

58. The method according to any one of clauses 52-57, wherein the second parameter is a flag and a third parameter is an index.

59. A video encoding apparatus, comprising:

a memory storing a set of instructions; and one or more processors configured to execute the set of instructions to cause the apparatus to perform:

determining a value of a fourth parameter associated with a chroma coding unit based on a value of a fourth parameter associated with a luma coding unit, wherein the fourth parameter indicates whether a bi-directional prediction correction is enabled;

in response to the value of the fourth parameter associated with the chroma coding unit indicating the bi-directional prediction correction being enabled, performing the bi-directional prediction correction on the chroma coding unit.

60. The apparatus according to clause 59, wherein the luma coding unit is a collocated block of the chroma coding unit.

61. The apparatus according to clause 59, wherein the one or more processors configured to execute the set of instructions to cause the apparatus to further perform:

determining a value of a fifth parameter associated with the chroma coding unit based on a value of a fifth parameter associated with the luma coding unit, wherein the fifth parameter indicates that one of bi-directional prediction correction methods is performed on the chroma coding unit.

62. The apparatus according to any one of clauses 59-61, wherein the fourth and the fifth parameters associated with the luma coding unit are encoded to a bitstream.

63. The apparatus according to any one of clauses 59-61, wherein the one or more processors configured to execute the set of instructions to cause the apparatus to further perform:

determining a candidate for the luma coding unit;

inheriting the fourth and the fifth parameters associated with the luma coding unit the candidate, and encoding a sixth parameter associated with the candidate to a bitstream.

64. A video encoding apparatus, comprising:

determining a value of a seventh parameter associated with a coding unit satisfied a plurality of conditions, wherein the seventh parameter indicates whether a bi-directional prediction correction is enabled; and in response to the value of the seventh parameter associated with the coding unit indicating the bi-directional prediction correction being enabled, performing the bi-directional prediction correction on the coding unit.

65. The method according to clause 64, wherein the plurality of conditions comprising:

determining two reference picture lists of the coding unit;

determining whether all the reference pictures in the two reference picture lists are prior to a current picture associated with the coding unit in display order; and in response to all the reference pictures in the two reference picture lists are prior to the current picture associated with the coding unit in display order, determining the coding unit to be satisfied the plurality of conditions.

66. The method according to clause 33, wherein the one or more processors configured to execute the set of instructions to cause the apparatus to further perform:

determining a value of an eighth parameter associated with the coding unit, wherein the eighth parameter indicates that one of bi-directional prediction correction methods is performed on the coding unit.

67. A non-transitory computer readable medium that stores a set of instructions that is executable by at least one processor of a computer to cause the computer to perform a video decoding method, the method comprising:

decoding a first parameter for a coding unit from a bitstream, and determining a candidate for the coding unit based on the first parameter;

determining a value of a second parameter associated with the coding unit based on a value of a second parameter associated with the candidate, wherein the second parameter indicates whether a bi-directional prediction correction is enabled; and in response to the value of the second parameter associated with the coding unit indicating the bi-directional prediction correction being enabled, performing the bi-directional prediction correction on the coding unit.

68. The non-transitory computer readable medium according to clause 67, wherein the at least one processor configured to execute the set of instructions to cause the computer to further perform:

determining that the value of the second parameter associated with the coding unit is equal to the value of the second parameter associated with the candidate.

69. The non-transitory computer readable medium according to clause 67, wherein the at least one processor configured to execute the set of instructions to cause the computer to further perform:

determining a value of a third parameter associated with the coding unit based on a value of a third parameter associated with the candidate, wherein the third parameter indicates that one of bi-directional prediction correction methods is performed.

70. The non-transitory computer readable medium according to any one of clauses 67-69, wherein the candidate is one of TMVP, SMVP, MVAP, HMVP, UMVE, InterPF, affine inherited, affine constructed, or zero affine candidates.

71. The non-transitory computer readable medium according to any one of clauses 67 and 70, wherein the candidate is a TMVP, a MVAP, or a zero affine candidate, determining the value of the second parameter associated with the coding unit based on the value of the second parameter associated with the candidate further comprises:

setting the value of the second parameter associated with the coding unit to be disabled, and disabling the bi-directional prediction correction for the coding unit.

72. The non-transitory computer readable medium according to the any one of clauses 67 and 70, wherein the candidate is an affine constructed candidate, determining the value of the second parameter associated with the coding unit based on the value of the second parameter associated with the candidate further comprises:

determining a plurality of control points for the coding unit, wherein the plurality of control points includes at least a first control point;

determining that the values of the second and the third parameters associated with the coding unit are equal to values of a second and a third parameters associated with the first control point, respectively.

73. The non-transitory computer readable medium according to any one of clauses 67-72, wherein the second parameter is a flag and a third parameter is an index.

74. A video decoding non-transitory computer readable medium that stores a set of instructions that is executable by at least one processor of a computer to cause the computer to perform a video decoding method, the method comprising:

determining a value of a fourth parameter associated with a chroma coding unit based on a value of a fourth parameter associated with a luma coding unit, wherein the fourth parameter indicates whether a bi-directional prediction correction is enabled; and in response to the value of the fourth parameter associated with the chroma coding unit indicating the bi-directional prediction correction being enabled, performing the bi-directional prediction correction on the chroma coding unit.

75. The non-transitory computer readable medium according to clause 74, wherein the luma coding unit is a collocated block of the chroma coding unit.

76. The non-transitory computer readable medium according to clause 74, further comprising:

determining a value of a fifth parameter associated with the chroma coding unit based on a value of a fifth parameter associated with the luma coding unit, wherein the fifth parameter indicates that one of bi-directional prediction correction methods is performed on the chroma coding unit.

77. The non-transitory computer readable medium according to any one of clauses 74-76, wherein:

the fourth and the fifth parameters associated with the luma coding unit are decoded from a bitstream.

78. The non-transitory computer readable medium according to any one of clauses 74-76, wherein:

the fourth and the fifth parameters associated with the luma coding unit are inherited from a candidate determined by a sixth parameter decoded from a bitstream.

79. A video decoding non-transitory computer readable medium that stores a set of instructions that is executable by at least one processor of a computer to cause the computer to perform a video decoding method, the method comprising:

determining a value of a seventh parameter associated with a coding unit satisfied a plurality of conditions, wherein the seventh parameter indicates whether a bi-directional prediction correction is enabled; and in response to the value of the seventh parameter associated with the coding unit indicating the bi-directional prediction correction being enabled, performing the bi-directional prediction correction on the coding unit.

80. The non-transitory computer readable medium according to clause 79, wherein the plurality of conditions comprising:

determining two reference picture lists of the coding unit;

determining whether reference pictures in the two reference picture lists are prior to a current picture associated with the coding unit in a display order; and in response to the reference pictures in the two reference picture lists being prior to the current picture associated with the coding unit in the display order, determining that the coding unit satisfies the plurality of conditions.

81. The non-transitory computer readable medium according to clause 79, further comprising:

determining a value of an eighth parameter associated with the coding unit, wherein the eighth parameter indicates that one of bi-directional prediction correction methods is performed on the coding unit.

82. The non-transitory computer readable medium according to clause 79, further comprising:

obtaining a first and a second predictions for the coding unit, wherein the first and the second predictions are predicted using motions of the coding unit;

determining a third prediction by applying a correct intensity factor to a difference between the first and the second predictions; and decoding the coding unit using the first, second and third predictions by averaging the first and the second predictions and adding the third prediction.

83. The non-transitory computer readable medium according to clause 82, wherein the difference between the first and the second predictions is one of:

the value of the difference between the first and the second predictions is equal to the first prediction minus the second prediction; or the value of the difference between the first and the second predictions is equal to the second prediction minus the first prediction.

84. The non-transitory computer readable medium according to clause 82, wherein the correct intensity factor is ⅛.

85. A video encoding non-transitory computer readable medium that stores a set of instructions that is executable by at least one processor of a computer to cause the computer to perform a video decoding method, the method comprising:

determining a candidate for a coding unit;

determining a value of a second parameter associated with the coding unit based on a value of a second parameter associated with the candidate, wherein the second parameter indicates whether a bi-directional prediction correction is enabled;

in response to the value of the second parameter associated with the coding unit indicating the bi-directional prediction correction being enabled, encoding the coding unit with the bi-directional prediction correction; and encoding a first parameter associated with the candidate to the bitstream.

86. The non-transitory computer readable medium according to clause 85, further comprising:

determining the value of the second parameter associated with the coding unit equal to the value of the second parameter associated with the candidate.

87. The non-transitory computer readable medium according to clause 85, wherein the at least one processor configured to execute the set of instructions to cause the computer to further perform:

determining a value of a third parameter associated with the coding unit based on a value of a third parameter associated with the candidate, wherein the third parameter indicates which one of bi-directional prediction correction methods is performed.

88. The non-transitory computer readable medium according to any one of clauses 85-87, wherein the candidate is one of TMVP, SMVP, MVAP, HMVP, UMVE, InterPF, affine inherited, affine constructed, or zero affine candidates.

89. The non-transitory computer readable medium according to clause 88, wherein the candidate being a TMVP, a MVAP, or a zero affine candidate, determining the value of the second parameter associated with the coding unit based on the value of the second parameter associated with the candidate further comprises:

setting the value of the second parameter associated with the coding unit to be disabled, and disabling the bi-directional prediction correction for the coding unit.

90. The non-transitory computer readable medium according to any one of clauses 85 and 88, wherein the candidate is an affine constructed candidate, determining the value of the second parameter associated with the coding unit based on the value of the second parameter associated with the candidate further comprises:

determining a plurality of control points for the coding unit, wherein the plurality of control points includes at least a first control point;

determining the values of the second and the third parameters associated with the coding unit equal to values of a second and a third parameters associated with the first control point, respectively.

91. The non-transitory computer readable medium according to any one of clauses 85-90, wherein the second parameter is a flag and a third parameter is an index.

92. A video encoding non-transitory computer readable medium that stores a set of instructions that is executable by at least one processor of a computer to cause the computer to perform a video decoding method, the method comprising:

determining a value of a fourth parameter associated with a chroma coding unit based on a value of a fourth parameter associated with a luma coding unit, wherein the fourth parameter indicates whether a bi-directional prediction correction is enabled;

in response to the value of the fourth parameter associated with the chroma coding unit indicating the bi-directional prediction correction being enabled, performing the bi-directional prediction correction on the chroma coding unit.

93. The non-transitory computer readable medium according to clause 92, wherein
the luma coding unit is a collocated block of the chroma coding unit.

94. The non-transitory computer readable medium according to clause 92, further comprising:

determining a value of a fifth parameter associated with the chroma coding unit based on a value of a fifth parameter associated with the luma coding unit, wherein the fifth parameter indicates that one of bi-directional prediction correction methods is performed on the chroma coding unit.

95. The non-transitory computer readable medium according to any one of clauses 92-94, wherein
the fourth and the fifth parameters associated with the luma coding unit are encoded to a bitstream.

96. The non-transitory computer readable medium according to any one of clauses 92-94, further comprising:

determining a candidate for the luma coding unit;
inheriting the fourth and the fifth parameters associated with the luma coding unit the candidate, and encoding a sixth parameter associated with the candidate to a bitstream.

97. A video encoding non-transitory computer readable medium that stores a set of instructions that is executable by at least one processor of a computer to cause the computer to perform a video decoding method, the method comprising:

determining a value of a seventh parameter associated with a coding unit satisfied a plurality of conditions, wherein the seventh parameter indicates whether a bi-directional prediction correction is enabled;

in response to the value of the seventh parameter associated with the coding unit indicating the bi-directional prediction correction being enabled, performing the bi-directional prediction correction on the coding unit.

98. The non-transitory computer readable medium according to clause 97, wherein the plurality of conditions comprising:

determining two reference picture lists of the coding unit;
determining whether all the reference pictures in the two reference picture lists are prior to a current picture associated with the coding unit in display order; and
in response to all the reference pictures in the two reference picture lists are prior to the current picture associated with the coding unit in display order, determining the coding unit to be satisfied the plurality of conditions.

99. The non-transitory computer readable medium according to clause 97, further comprising:

determining a value of an eighth parameter associated with the coding unit, wherein the eighth parameter indicates that one of bi-directional prediction correction methods is performed on the coding unit.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:
1. A video decoding method, comprising:
decoding a first parameter for a coding unit from a bitstream,
determining a candidate for the coding unit based on the first parameter;
determining a value of a second parameter associated with the coding unit based on a value of a second parameter associated with the candidate, wherein the second parameter associated with the coding unit indicates whether a bi-directional prediction correction is enabled; and in response to the value of the second parameter associated with the coding unit indicating the bi-directional prediction correction being enabled, performing the bi-directional prediction correction on the coding unit.

2. The method according to claim 1, further comprising: determining that the value of the second parameter associated with the coding unit is equal to the value of the second parameter associated with the candidate.

3. The method according to claim 1, further comprising: determining a value of a third parameter associated with the coding unit based on a value of a third parameter associated with the candidate, wherein the third parameter associated with the coding unit indicates that one of bi-directional prediction correction methods is performed.

4. The method according to claim 1, wherein the candidate is one of TMVP, SMVP, MVAP, HMVP, UMVE, InterPF, affine inherited, affine constructed, or zero affine candidates.

5. The method according to claim 1, wherein the candidate is a TMVP, a MVAP, or a zero affine candidate and wherein determining the value of the second parameter associated with the coding unit based on the value of the second parameter associated with the candidate further comprises:
setting the value of the second parameter associated with the coding unit to be disabled, and
disabling the bi-directional prediction correction for the coding unit.

6. The method according to claim 1, wherein the candidate is an affine constructed candidate and wherein determining the value of the second parameter associated with the coding unit based on the value of the second parameter associated with the candidate further comprises:
determining a plurality of control points for the coding unit, wherein the plurality of control points includes at least a first control point;
determining that the values of the second and the third parameters associated with the coding unit are equal to values of a second and a third parameters associated with the first control point, respectively.

7. The method according to claim 1, wherein the second parameter associated with the coding unit is a flag and a third parameter associated with the coding unit is an index.

8. A video processing apparatus, comprising: a memory storing a set of instructions; and
one or more processors configured to execute the set of instructions to cause the apparatus to perform:
decoding a first parameter for a coding unit from a bitstream, and determining a candidate for the coding unit based on the first parameter;
determining a value of a second parameter associated with the coding unit based on a value of a second parameter associated with the candidate, wherein the second parameter associated with the coding unit indicates whether a bi-directional prediction correction is enabled; and
in response to the value of the second parameter associated with the coding unit indicating the bi-directional prediction correction being enabled, performing the bi-directional prediction correction on the coding unit.

9. The apparatus according to claim 8, wherein the one or more processors configured to execute the set of instructions to cause the apparatus to further perform:
determining that the value of the second parameter associated with the coding unit is equal to the value of the second parameter associated with the candidate.

10. The apparatus according to claim 8, wherein the one or more processors configured to execute the set of instructions to cause the apparatus to further perform:
determining a value of a third parameter associated with the coding unit based on a value of a third parameter associated with the candidate, wherein the third parameter associated with the coding unit indicates that one of bi-directional prediction correction methods is performed.

11. The apparatus according to claim 8, wherein the candidate is one of TMVP, SMVP, MVAP, HMVP, UMVE, InterPF, affine inherited, affine constructed, or zero affine candidates.

12. The apparatus according to claim 8, wherein the candidate is a TMVP, a MVAP, or a zero affine candidate, determining the value of the second parameter associated with the coding unit based on the value of the second parameter associated with the candidate further comprises:
setting the value of the second parameter associated with the coding unit to be disabled, and disabling the bi-directional prediction correction for the coding unit.

13. The apparatus according to claim 8, wherein the candidate is an affine constructed candidate, determining the value of the second parameter associated with the coding unit based on the value of the second parameter associated with the candidate further comprises:
determining a plurality of control points for the coding unit, wherein the plurality of control points includes at least a first control point;
determining that the values of the second and the third parameters associated with the coding unit are equal to values of a second and a third parameters associated with the first control point, respectively.

14. The apparatus according to claim 8, wherein the second parameter associated with the coding unit is a flag and a third parameter associated with the coding unit is an index.

15. A video decoding apparatus, comprising:
a memory storing a set of instructions; and
one or more processors configured to execute the set of instructions to cause the apparatus to perform:
determining a value of a first parameter associated with a chroma coding unit based on a value of a first parameter associated with a luma coding unit, wherein the first parameter associated with the chroma coding unit indicates whether a bi-directional prediction correction is enabled; and
in response to the value of the first parameter associated with the chroma coding unit indicating the bi-directional prediction correction being enabled, performing the bi-directional prediction correction on the chroma coding unit.

16. A non-transitory computer readable medium that stores a set of instructions that is executable by at least one processor of a computer to cause the computer to perform a video decoding method, the method comprising:
decoding a first parameter for a coding unit from a bitstream, and determining a candidate for the coding unit based on the first parameter;
determining a value of a second parameter associated with the coding unit based on a value of a second parameter associated with the candidate, wherein the second parameter associated with the coding unit indicates whether a bi-directional prediction correction is enabled; and
in response to the value of the second parameter associated with the coding unit indicating the bi-directional prediction correction being enabled, performing the bi-directional prediction correction on the coding unit.

17. The non-transitory computer readable medium according to claim 16, wherein the at least one processor configured to execute the set of instructions to cause the computer to further perform:
   determining that the value of the second parameter associated with the coding unit is equal to the value of the second parameter associated with the candidate.

18. The non-transitory computer readable medium according to claim 16, wherein the at least one processor configured to execute the set of instructions to cause the computer to further perform:
   determining a value of a third parameter associated with the coding unit based on a value of a third parameter associated with the candidate, wherein the third parameter associated with the coding unit indicates that one of bi-directional prediction correction methods is performed.

19. The non-transitory computer readable medium according to claim 16, wherein the candidate is one of TMVP, SMVP, MVAP, HMVP, UMVE, InterPF, affine inherited, affine constructed, or zero affine candidates.

20. The non-transitory computer readable medium according to claim 16, wherein the candidate is a TMVP, a MVAP, or a zero affine candidate, determining the value of the second parameter associated with the coding unit based on the value of the second parameter associated with the candidate further comprises:
   setting the value of the second parameter associated with the coding unit to be disabled, and disabling the bi-directional prediction correction for the coding unit.

21. The non-transitory computer readable medium according to claim 16, wherein the candidate is an affine constructed candidate, determining the value of the second parameter associated with the coding unit based on the value of the second parameter associated with the candidate further comprises:
   determining a plurality of control points for the coding unit, wherein the plurality of control points includes at least a first control point;
   determining that the values of the second and the third parameters associated with the coding unit are equal to values of a second and a third parameters associated with the first control point, respectively.

22. The non-transitory computer readable medium according to claim 16, wherein the second parameter associated with the coding unit is a flag and a third parameter associated with the coding unit is an index.

23. A video decoding non-transitory computer readable medium that stores a set of instructions that is executable by at least one processor of a computer to cause the computer to perform a video decoding method, the method comprising:
   determining a value of a first parameter associated with a chroma coding unit based on a value of a first parameter associated with a luma coding unit, wherein the first parameter associated with the chroma coding unit indicates whether a bi-directional prediction correction is enabled; and
   in response to the value of the first parameter associated with the chroma coding unit indicating the bi-directional prediction correction being enabled, performing the bi-directional prediction correction on the chroma coding unit.

\* \* \* \* \*